United States Patent [19]

Egger

[11] Patent Number: 5,544,352
[45] Date of Patent: Aug. 6, 1996

[54] METHOD AND APPARATUS FOR INDEXING, SEARCHING AND DISPLAYING DATA

[75] Inventor: Daniel Egger, Washington, D.C.

[73] Assignee: Libertech, Inc., Durham, N.C.

[21] Appl. No.: 76,658

[22] Filed: Jun. 14, 1993

[51] Int. Cl.[6] .................................................. G06F 17/30
[52] U.S. Cl. .............. 395/600; 364/419.19; 364/DIG. 1; 364/282.1; 364/283.3
[58] Field of Search ........................ 395/600; 364/419.19, 364/419.13

[56] References Cited

U.S. PATENT DOCUMENTS

| | | | |
|---|---|---|---|
| 4,839,853 | 6/1989 | Deerwester et al. | 395/600 |
| 4,945,476 | 7/1990 | Bodick et al. | 364/413.02 |
| 5,122,951 | 6/1992 | Kamiya | 364/419.13 |
| 5,157,783 | 10/1992 | Anderson et al. | 395/600 |
| 5,206,949 | 4/1993 | Cochran et al. | 395/600 |
| 5,241,671 | 8/1993 | Reed et al. | 395/600 |
| 5,243,655 | 9/1993 | Wang | 380/51 |
| 5,301,109 | 4/1994 | Landauer et al. | 364/419.19 |
| 5,325,298 | 6/1994 | Gallant | 364/419.19 |
| 5,418,948 | 5/1995 | Turtle | 395/600 |

OTHER PUBLICATIONS

Agosti, et al., "A Two–Level Hypertext Retrieval Model for Legal Data," SIGIR '91 (1991).
Fowler, et al., "Integrating Query, Thesaurus and Documents Through a Commn Visual Representation," SIGIR '91 (1991).
Rose & Belew, "Legal Information Retrieval: a Hybrid Approach," ICAIL '89 (1989).
Belew, Richard, "A Connectionist Approach to Conceptual Information Retrieval," ICAIL '87 (1987).
Gelbart & Smith, "Beyond Boolean Search: FLEXICON, A Legal Text–Based Intelligent System," ICAIL '91 (1991).
Lin, "A Self–Organizing Semantic Map for Information Retrieval," SIGIR '91 (1991).
Turtle & Croft, "Inference Networks for Document Retrieval," SIGR '90 (1990).

*Primary Examiner*—Thomas G. Black
*Assistant Examiner*—Wayne Amsbury
*Attorney, Agent, or Firm*—Dorsey & Whitney PLLP

[57] ABSTRACT

A computer research tool for indexing, searching and displaying data is disclosed. Specifically, a computer research tool for performing computerized research of data including textual objects in a database and for providing a user interface that significantly enhances data presentation is described. Textual objects and other data in a database are indexed by creating a numerical representation of the data. The indexing technique called proximity indexing generates a quick-reference of the relations, patterns and similarity found among the data in the database. Proximity indexing indexes the data by using statistical techniques and empirically developed algorithms. Using this proximity index, an efficient search for pools of data having a particular relation, pattern or characteristic can be effectuated. The Computer Search program, called the Computer Search Program for Data represented in Matrices (CSPDM), provides efficient computer search methods. The CSPDM rank orders data in accordance with the data's relationship to time, a paradigm datum, or any similar reference. The user interface program, called the Graphical User Interface (GUI), provides a user friendly method of interacting with the CSPDM program and prepares and presents a visual graphical display. The graphical display provides the user with a two dimensional spatial orientation of the data.

52 Claims, 24 Drawing Sheets

Fig. 5C

METHOD AND APPARATUS FOR INDEXING, SEARCHING AND DISPLAYING DATA

TECHNICAL FIELD

This invention pertains to computerized research tools. More particularly, it relates to computerized research on stored databases. Specifically, the invention indexes data, searches data, and graphically displays search results with a user interface.

BACKGROUND

Our society is in the information age. Computers maintaining databases of information have become an everyday part of our lives. The ability to efficiently perform computer research has become increasingly more important. The area in our society in which this is most evident is the legal profession. A major problem in the legal profession today is the great deal of time spent performing legal research. Many aspects of legal research are tedious and time consuming. Therefore, performing legal research detracts from the amount of time the attorney is able to spend on tasks that actually require him to utilize his legal judgment and reasoning. Recent efforts in the art of computer research have been aimed at reducing the time required to accomplish legal research. Current computer search programs use a text-by-text analysis procedure (Boolean Search) to scan a database and retrieve items from a database. The attorney must input a string of text, and the computer evaluates this string of text. Then the computer retrieves items from the database that match the string of text. The two most popular systems for computerized searching of data used in the legal profession are Westlaw™, a service sold by West Publishing Company, 50 W. Kellogg Blvd., P.O. Box 64526, St. Paul, Minn. 55164-0526, and Lexis™, a service sold by Mead Data Central, P.O. Box 933, Dayton, Ohio 45401.

However, Boolean searches of textual material are not very efficient. Boolean searches only retrieve exactly what the computer interprets the attorney to have requested. If the attorney does not phrase his or her request in the exact manner in which the database represents the textual object, the Boolean search will not retrieve the desired textual object. For example, if the attorney desires to retrieve cases in which a judge decided the issue before the jury could decide it, the attorney may enter "Summary Judgment" as his textual string. However, such a request will not retrieve cases that were decided by the judge under a motion to dismiss. Therefore, the researcher may effectively be denied access to significant cases, statutes, laws or other textual objects that may be crucial to the project on which the attorney is working. A second problem encountered with Boolean searches is that the search retrieves a significant amount of irrelevant textual objects. (It should be noted that in the context of legal research, a textual object could be any type of written legal material such as a judicial opinion, a statute, a treatise, a law review article, etc. The term textual object is used to stress the fact that the present invention applies to all types of databases, and not just legal research databases). The only requirement that a textual object must satisfy in order to be selected by a Boolean search program is that part of the textual object match the particular request of the researcher. For example, if the researcher desires to recover all cases that relate to a Fourth Amendment issue, the researcher may input "search and seizure" as his textual string. However, the computer will retrieve every case that happens to mention "search and seizure" one time, even if the case has nothing to do with a Fourth Amendment issue. Since the researcher cannot possibly know all of the groupings of text within all the textual objects in the database, the researcher is unable to phrase his request to only retrieve the textual objects that are relevant.

Aside from the inefficiency of Boolean searches, the present systems for computerized searching of data are inadequate to serve the needs of a researcher for several other reasons. Even if one assumes that all the textual objects retrieved from a Boolean search are relevant, the listing of the textual objects as done by Westlaw™ or Lexis™ does not convey some important and necessary information to the researcher. The researcher does not know which textual objects are the most significant (i.e., which textual object is referred to the most by another textual object) or which textual objects are considered essential precedent (i.e., which textual objects describe legal doctrines).

In addition, both Westlaw™ and Lexis™ have a Shepardizing™ feature that enables the researcher to view a list of textual objects that mention a particular textual object. The shepardizing feature does not indicate how many times a listed textual object mentions the particular textual object. Although the shepardizing feature uses letter codes to indicate the importance of a listed textual object (e.g. an "f" beside a listed textual object indicates that the legal rule contained in particular textual object was followed in the listed textual object), data on whether a listed textual object followed the rule of a particular textual object is entered manually by employees of Shepard's™/McGraw Hill, Inc., Div. of McGraw-Hill Book Co., 420 N. Cascade Ave., Colorado Springs, Colo. 80901, toll free 1-800-525-2474. Therefore, such process is subjective and is prone to error.

Another legal research system that is available is the Westlaw™ key number system. The Westlaw™ key number system has a problem similar to the shepardizing feature on the Lexis™ and Westlaw™ systems. West key numbers are groups of textual objects organized by topic. The West key numbers enable a researcher to search for textual objects on a computerized system via the key numbers. However, the employees of West™ manually determine which cases should be categorized under which key number. Therefore, such a numbering process is subjective and is prone to error. Furthermore, many people in the legal profession have criticized the West key number system because the system is very slow to recognize new topic areas, very rigid and very difficult to keep up to date. In addition, the West™ key number system, like Boolean searches, produces pools of cases that are over-inclusive or under-inclusive.

The video displays of both the West™ and Lexis™ systems are difficult to use. The simple text displays of these systems do not provide a researcher with all the information that is available in the database.

Computerized research tools for legal opinions and related documents are probably the most sophisticated computer research tools available and therefore form the background for this invention. However, the same or similar computer research tools are used in many other areas. For example, computer research tools are used for locating prior art for a patent application. The same problems of inefficiency discussed above exist for computer research tools in many areas of our society.

What is needed is a system for computerized searching of data that is faster than the available systems of research.

What is needed is a system for computerized searching of data that enables attorneys to research in a manner in which they are familiar.

What is needed is a computerized research tool that will reorganize, re-index or reformat the data into a more efficient format for searching.

What is needed are more sophisticated methods to search data.

What is needed is a system for computerized searching of data that will significantly reduce the number of irrelevant textual objects it retrieves.

What is needed is a user friendly computerized research tool.

What is needed is a visual user interface which can convey information to a user conveniently.

What is needed is a system for computerized searching of data that easily enables the attorney himself to classify the textual object according to his or her own judgment.

What is needed is a system for computerized searching of data that provides a visual representation of "lead" textual objects and "lines" of textual objects, permitting a broad overview of the shape of the relevant legal "landscape."

What is needed is a system for computerized searching of data that provides an easily-grasped picture or map of vast amounts of discrete information, permitting researchers (whether in law or other databases) to "zero in" on the most relevant material.

What is needed is a system for computer searching of data that provides a high degree of virtual orientation and tracking, the vital sense of where one has been and where one is going, and that prevents researchers from becoming confused while assimilating a large amount of research materials.

Accordingly, there is an unanswered need for a user friendly computerized research tool. There is a need for "intelligent" research technology that emulates human methods of research. There is a need in the marketplace for a more efficient and intelligent computerized research tool.

The present invention is designed to address these needs.

SUMMARY OF THE INVENTION

This invention is a system for computerized searching of data. Specifically, the present invention significantly aids a researcher in performing computerized research on a database. The invention simplifies the research task by improving upon methods of searching for data including textual objects and by implementing a user interface that significantly enhances the presentation of the data. Simplifying such research reduces the amount of human time that must be allocated to research.

The invention begins with an existing database and indexes the data by creating a numerical representation of the data. This indexing technique called proximity indexing generates a quick-reference of the relations, patterns, and similarity found among the data in the database. Using this proximity index, an efficient search for pools of data having a particular relation, pattern or characteristic can be effectuated. This relationship can then be graphically displayed.

There are three main components to the invention; a data indexing applications program, a Computer Search Program for Data Represented by Matrices ("CSPDM"), and a user interface. Various indexing application programs, CSPDMs, and user interface programs can be used in combination to achieve the desired results. The data indexing program indexes data into a more useful format. The CSPDM provides efficient computer search methods. The preferred CSPDM includes multiple search subroutines. The user interface provides a user friendly method of interacting with the indexing and CSPDM programs. The preferred user interface program allows for easy entry of commands and visual display of data via a graphical user interface.

The method which the invention uses to index textual objects in a database is called Proximity Indexing. Proximity Indexing is a method of preparing data in a database for subsequent searching by advanced data searching programs. Proximity Indexing indexes the data by using statistical techniques and empirically developed algorithms. The resulting search by an advanced data searching program of the Proximity Indexed data is significantly more efficient and accurate than a simple Boolean search.

The Proximity Indexing Application Program indexes the database into a more useful format to enable the Computer Search Program for Data Represented by Matrices (CSPDM) to efficiently search the database. The Proximity Indexing Application Program of the preferred embodiment has several subroutines, including the Extractor, the Patterner, and the Weaver. The Proximity Indexing Application Program indexes data in a locally located database or remotely located database. The database can contain any type of data including text, alphanumerics, or graphical information.

In the preferred embodiment, the database is located remotely from the Computer Processor and contains data in the form of textual objects. The Proximity Indexing Application Program indexes the textual objects by determining how each full textual object (e.g., whole judicial opinion, statute, etc.) relates to every other full textual object by using empirical data and statistical techniques. Once each full textual object is related to each other full textual object, the Proximity Indexing Application Program compares each paragraph of each full textual object with every other full textual object as described above. The Proximity Indexing Application Program then clusters related contiguous paragraphs into sections. Subsequently, the Proximity Indexing Application Program indexes each section and the CSPDM evaluates the indexed sections to determine which sections to retrieve from the database. Such organization and classification of all of the textual objects in the database before any given search commences significantly limits the irrelevant textual objects that the CSPDM program retrieves during the subsequent search and allows retrieval of material based on its degree of relevancy.

Legal research searches on systems like Westlaw™ and Lexis™ only use a series of interrelated Boolean searches of actual text to retrieve textual objects from databases. These searches unnecessarily consume valuable time and retrieve a significant number of irrelevant textual objects.

Again, this method of computerized research can be used for nearly any database including those containing non-textual material, graphical material, newspaper material, data on personal identification, data concerning police records, etc.

The remaining two programs in the present invention are the CSPDM and the GUI Program. The CSPDM has seven subroutines that each search for different pools of textual objects. The GUI Program also has seven subroutines. Each subroutine performs a different type of search. Each of the subroutines of the GUI uses the results of the corresponding subroutine of the CSPDM to create the proper display on the display.

After the Proximity Indexing Application Program indexes a database, the CSPDM application program is used to search the indexed database. The CSPDM program can either be located in memory that is remote from the Computer Processor or local to the Computer Processor. In addition, the CSPDM program can either be remote or local in relation to the database.

The subroutines of the CSPDM that utilize the matrix coefficients and other data created by the Proximity Indexing Application Program to facilitate its search. However, if the researcher does not have the particular textual object citation available, the researcher can perform a Boolean search to retrieve and organize a pool of textual objects. Alternatively, the researcher can subsequently search for related textual objects by using the Pool-Similarity Subroutine, the Pool-Paradigm Subroutine, the Pool-Importance Subroutine or the Pool-Paradigm-Similarity Subroutine as defined below.

If the researcher already has the citation of a particular textual object available, the researcher can search for related textual objects by utilizing the Cases-In Subroutine, Cases-After Subroutine or Similar-Cases Subroutine. The Cases-In Subroutine retrieves all of the textual objects from the database to which a selected textual object refers. In addition, the subroutine determines the number of times the selected textual object refers to each retrieved textual object and other characteristics of each textual object, including its importance, and degree of relatedness to the selected textual object.

The Cases-After Subroutine retrieves all of the textual objects from the database that refer to the selected textual object. Also, the subroutine determines the number of times each retrieved textual object refers to the selected textual object and other characteristics of each textual object, including its importance, and degree of relatedness to the particular textual object to which it refers.

The Similar-Cases Subroutine determines the degree of similarity between the retrieved textual objects and the selected textual object. Similarity is defined, in the context of legal cases, as the extent to which the two textual objects lie in the same lines of precedent or discuss the same legal topic or concept.

In addition, if the researcher does not know of a certain particular textual object on which to base his or her search, the researcher may execute a Boolean word search. After a standard Boolean word search has been run, the researcher may run the Pool-Similarity Subroutine to retrieve information containing the degree of similarity between each textual object in the pool and a particular textual object selected by the user. Similarly, the Pool-Importance Subroutine can be used to determine the degree of importance (i.e., whether a judicial opinion is a Supreme Court opinion or a District Court opinion) and other characteristics of each textual object retrieved using the Boolean word search.

The Pool-Paradigm Subroutine calculates the geographic center in vector space of the pool of textual objects retrieved by the Boolean word search or other pool generating method. It then orders the retrieved textual objects by their degree of similarity to that center or "paradigm." The researcher can then evaluate this "typical textual object" and utilize it to help him or her find other relevant textual objects. In addition, the researcher can scan through neighboring "typical textual objects" to evaluate legal subjects that are closely related to the subject of the researcher's search.

The Pool-Paradigm-Similarity Subroutine similarly creates a paradigm textual object from the retrieved textual objects. However, the subroutine calculates the similarity of all textual objects in the database to the paradigm textual object in addition to the similarity of the retrieved textual objects to the paradigm textual object.

After the CSPDM has retrieved the desired textual objects, the Graphical User Interface (GUI) Program may be used to display the results of the search on the display. The GUI is a user interface program. The GUI Program contains three main subroutines: Cases-In Display Subroutine (CIDS), Cases-After Display Subroutine (CADS) and Similar-Cases Display Subroutine (SCDS). The main subroutines receive information from the corresponding subroutines Cases-In, Cases-After and Similar-Cases of the CSPDM. The GUI Program also contains four secondary subroutines: Pool-Similarity Display Subroutine ("PSDS"), Pool-Paradigm Display Subroutine ("PPDS"), Pool-Importance Display Subroutine ("PIDS"), and the Pool-Paradigm-Similarity Subroutine (PPSDS). The secondary subroutines also receive information from the corresponding subroutines Pool-Similarity Subroutine, Pool-Paradigm Subroutine, Pool-Importance Subroutine and the Pool-Paradigm Similarity Subroutine of the CSPDM.

The CIDS subroutine receives information gathered from the Cases-In Subroutine of the CSPDM. The CIDS subroutine displays user friendly active boxes and windows on the display 38 which represent the textual objects retrieved from the database represented in Euclidean space. The display depicts the appropriate location of textual objects in Euclidean space on a coordinate means. The coordinate means may have one or more axis, but the present embodiment contains two axes. The horizontal axis of the coordinate means represents the time of textual object creation. The vertical axis represents a weighted combination of the number of sections in which that particular retrieved text is cited or discussed, its degree of importance, and its degree of similarity to the host textual object. The CIDS also enables the researcher to open up various active boxes on the display by entering a command into the computer processor with the input means. After entering the proper command, the active box transforms into a window displaying additional information about the selected textual object. These windows can be moved about the display and stacked on top or placed beside each other via the input means to facilitate viewing of multiple windows of information simultaneously. Since the number of textual objects retrieved in a single search may exceed the amount which could be displayed simultaneously, the GUI Program enables the researcher to "zoom in" or "zoom out" to different scales of measurement on both the horizontal and vertical axis.

The CADS receives information gathered by the Cases-After Subroutine of the CSPDM. The CADS creates a display similar to the CIDS display. However, the active boxes representing the retrieved textual objects indicate which textual objects in the database refer to a selected textual object as opposed to which textual objects a selected textual object refers.

The SCDS receives information gathered by the Similar-Cases Subroutine of the CSPDM. The SCDS causes a similar display on the display as the CIDS and the CADS except that the vertical axis indicates the degree of similarity between the retrieved textual objects and the selected textual object.

The GUI Program contains four secondary subroutines: Pool-Search Display Subroutine (PSDS), Pool-Paradigm Display Subroutine (PPDS), Pool-Importance Display Subroutine (PIDS) and the Pool-Paradigm-Similarity Display Subroutine (PPSDS). The PSDS receives the results gathered by the Pool-Search Subroutine of the CSPDM. The PPDS receives the results gathered by the Pool-Paradigm Subroutine of the CSPDM. The PIDS receives the results gathered by the Pool-Importance Subroutine of the CSPDM.

The PPSDS receives the results gathered by the Pool-Paradigm-Similarity Subroutine of the CSPDM. The results of the PSDS, PPDS, PIDS and PPSDS are then displayed in a user friendly graphical manner similar to the results of the CIDS, CADS and SCDS. A researcher can access the PSDS, PIDS, PSDS or PPSDS from any of the three main or four secondary subroutines of the GUI to gather information corresponding to the active boxes that represent the pool of textual objects retrieved by the corresponding subroutine of the CSPDM.

By using the graphical display, the researcher can view immediately a visual representation of trends developing in the law and current and past legal doctrines. In addition, the researcher can immediately identify the important precedent and which textual object serving as the precedent is most important to the project on which the researcher is working. This visual representation is a vast improvement over the current computerized research tools. Furthermore, the researcher using the present invention does not have to rely on the interpretation of another person to categorize different textual objects because the researcher can immediately visualize the legal trends and categories of law. In addition, new topic areas can be recognized without direct human intervention. The current research programs require a researcher to read through the actual text of a number of textual objects in order to determine which textual objects are important, interrelated, or most closely related to the topic at hand and which ones are not.

It is an object of this invention to create an efficient and intelligent system for computerized searching of data that is faster than available systems of research.

It is an object of the invention to integrate the system of computerized searching into the techniques to which researchers are already accustomed.

It is an object of the invention to utilize statistical techniques along with empirically generated algorithms to reorganize, re-index and reformat data in a database into a more efficient model for searching.

It is an object of the invention to utilize statistical techniques along with empirically generated methods to increase the efficiency of a computerized research tool.

It is an object of the invention to create a system of computerized searching of data that significantly reduces the number of irrelevant textual objects retrieved.

It is an object of this invention to create a user friendly interface for computer search tools which can convey a significant amount of information quickly.

It is an object of the invention to enable the researcher to easily and immediately classify retrieved textual objects according to the researcher's own judgment.

It is an object of the invention to provide a visual representation of "lead" textual objects and "lines" of textual objects, permitting a broad overview of the shape of the relevant legal "landscape."

It is an object of the invention to provide an easily-grasped picture or map of vast amounts of discrete information, permitting researchers (whether in law or other databases) to "zero in" on the most relevant material.

It is an object of the invention to provide a high degree of virtual orientation and tracking that enables a researcher to keep track of exactly what information the researcher has already researched and what information the researcher needs to research.

These and other objects and advantages of the invention will become obvious to those skilled in the art upon review of the description of a preferred embodiment, and the appended drawings and claims.

DESCRIPTION OF THE DRAWINGS

FIG. 4I is a high level flow chart showing two possible alternate Pool-Paradigm-Similarity Subroutines.

FIG. 5C is an example of the display after a user selects an active box representing a textual object retrieved by the Cases-After Subroutine and chooses to open the "full text" window relating to the icon.

DETAILED DESCRIPTION OF THE PREFERRED EMBODIMENT

Figure 1:
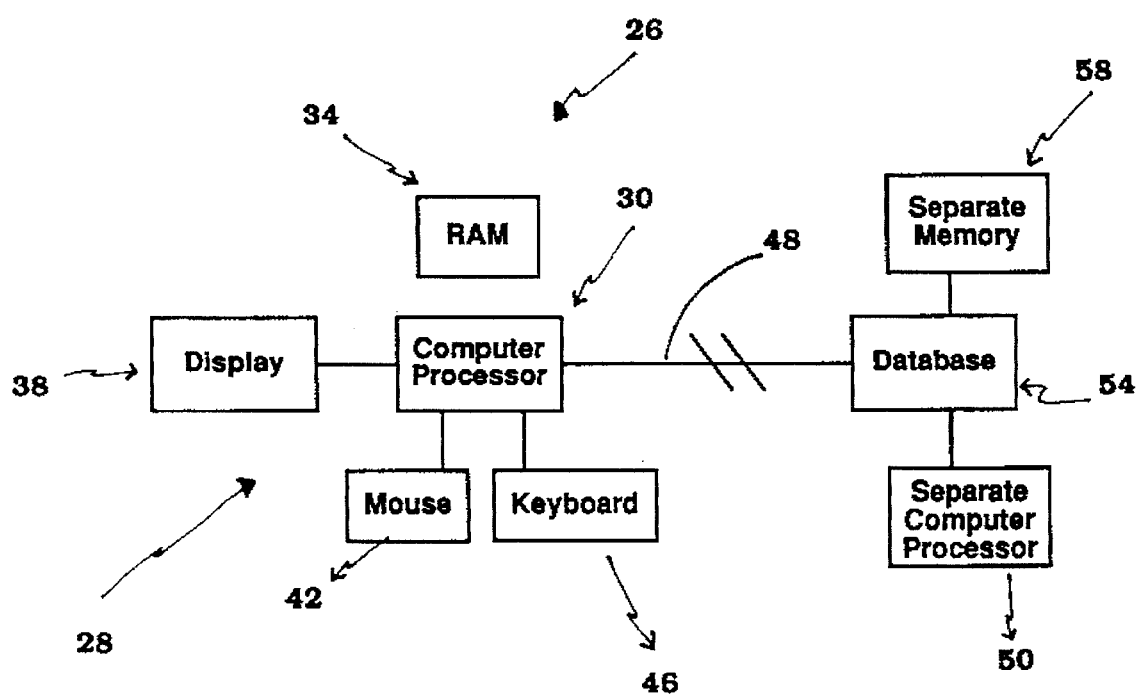
FIG. 1 is a high level diagram of the hardware for the system for computerized searching of data.

Referring now to the drawings, the preferred embodiment of the present invention will be described.

FIG. 1 is an overview of the preferred embodiment of the hardware system 26 for computerized searching of data. The hardware system 26 comprises a Computer Processor 30, a database 54 for storing data, input means, display 38, and RAM 34.

The Computer Processor 30 can be a processor that is typically found in Macintosh computers, IBM computers, portable PCs, clones of such PC computers (e.g. Dell computers), any other type of PC, or a processor in a more advanced or more primitive computing device. Parallel processing techniques may also be utilized with this invention.

The database 54 is connected to the Computer Processor 30 and can be any device which will hold data. For example, the database 54 can consist of any type of magnetic or optical storing device for a computer. The database 54 can be located either remotely from the Computer Processor 30 or locally to the Computer Processor 30. The preferred embodiment shows a database 54 located remotely from the Computer Processor 30 that communicates with the personal computer 28 via modem or leased line. In this manner, the database 54 is capable of supporting multiple remote computer processors 50. The preferred connection 48 between the database 54 and the Computer Processor 30 is a network type connection over a leased line. It is obvious to one skilled in the art that the database 54 and the Computer Processor 30 may be electronically connected in a variety of ways. In the preferred embodiment the database 54 provides the large storage capacity necessary to maintain the many records of textual objects.

The input means is connected to the Computer Processor 30. The user enters input commands into the Computer Processor 30 through the input means. The input means could consist of a keyboard 46, a mouse 42, or both working in tandem. Alternatively, the input means could comprise any device used to transfer information or commands from the user to the Computer Processor 30.

The display 38 is connected to the Computer Processor 30 and operates to display information to the user. The display 38 could consist of a computer monitor, television, LCD, LED, or any other means to convey information to the user.

The Random Access Memory (RAM 34) is also connected to the Computer Processor 30. The software system 60 for computerized searching of data may reside in the RAM 34, which can be accessed by the Computer Processor 30 to retrieve information from the software routines. A Read Only Memory (ROM), Erasable Programmable Read Only Memory (EPROM), disk drives, or any other magnetic storage device could be used in place of the RAM 34. Furthermore, the RAM 34 may be located within the structure of the Computer Processor 30 or external to the structure.

The hardware system 26 for computerized searching of data shown in FIG. 1 supports any one, or any combination, of the software programs contained in the software system 60 for computerized searching of data. The software system 60 for the computerized searching of data comprises one or more of the following programs: the Proximity Indexing Application Program 62, the Computer Search Program for Data Represented by Matrices (CSPDM 66) and the Graphical User Interface (GUI) Program. The Proximity Indexing Application Program 62 could reside in RAM 34 or in separate memory connected to the database 54. The Computer Processor 30 or a separate computer processor 50 attached to the database 54 could execute the Proximity Indexing Application Program 62. In the preferred embodiment the Proximity Indexing Application Program 62 resides in separate memory that is accessible to the database 54, and a separate computer processor 50 attached to the database 54 executes the Proximity Indexing Application Program 62.

The CSPDM 66 could reside in the RAM 34 connected to the Computer Processor 30 or in the separate memory connected to the database 54. In the preferred embodiment, the CSPDM 66 is located in the RAM 34 connected to the Computer Processor 30. The CSPDM 66 may use the display 38 to depict input screens for user entry of information.

The GUI Program 70 could likewise reside in the RAM 34 connected to the Computer Processor 30 or in separate memory connected to the database 54. In the preferred embodiment, the GUI Program 70 is located in the RAM 34 connected to the Computer Processor 30. The GUI Program 70 also communicates with the display 38 to enhance the manner in which the display 38 depicts information.

Figure 2:
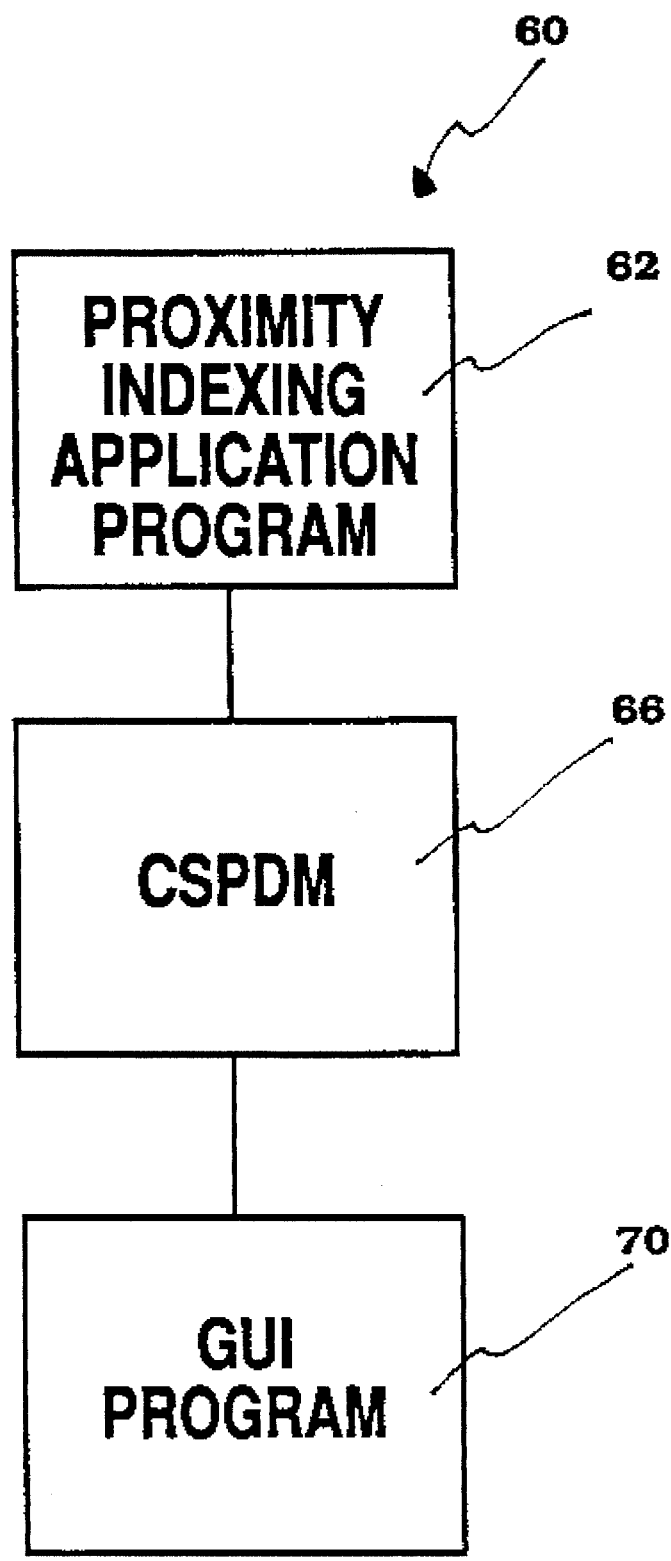
FIG. 2 is high level diagram of the software for the system for computerized searching of data. The three main programs are the Proximity Indexing Application Program, the Computer Search Program for Data Represented by Matrices (CSPDM) Application Program and the Graphical User Interface (GUI) Program.

FIG. 2 is an overview of the preferred embodiment of the software system 60 for computerized searching of data. The software system 60 for computerized searching of data comprises at least one or more of the following programs: the Proximity Indexing Application Program 62, the Computer Search Program for Data Represented by Matrices (CSPDM 66) and the Graphical User Interface (GUI) Program. Proximity Indexing is a method of identifying relevant data by using statistical techniques and empirically developed algorithms. The Proximity Indexing Application Program 62 is an application program which indexes the database 54 to a proper format to enable the Computer Search Program for Data Represented by Matrices (CSPDM 66) to properly search the database 54. The Proximity Indexing Application Program 62 can index data in a local database 54 or a remote database 54. The Proximity Indexing Application Program 62 is shown in more detail in FIGS. 3A to 3D.

After the Proximity Indexing Application Program 62 indexes the database 54, the CSPDM 66 application program can adequately search the database 54. The CSPDM 66 program searches the database 54 for textual objects according to instructions that the user enters into the Computer Processor 30 via the input means. The CSPDM 66 then retrieves the requested textual objects. The CSPDM 66 either relays the textual objects and other information to the GUI program in order for the GUI program to display this information on the display 38, or the CSPDM 66 sends display commands directly to the Computer Processor 30 for display of this information. However, in the preferred embodiment, the CSPDM 66 relays the textual objects and other commands to the GUI Program 70. The CSPDM 66 is described in more detail in FIGS. 4A to 4I.

After the CSPDM 66 has retrieved the textual objects, the Graphical User Interface (GUI) Program, which is a user interface program, causes the results of the search to be depicted on the display 38. The GUI Program 70 enhances the display of the results of the search conducted by the CSPDM 66. The GUI Program 70, its method and operation, can be applied to other computer systems besides a system for computerized searching of data. The GUI Program 70 is described in more detail in FIGS. 5A to 5H.

Figure 3A:
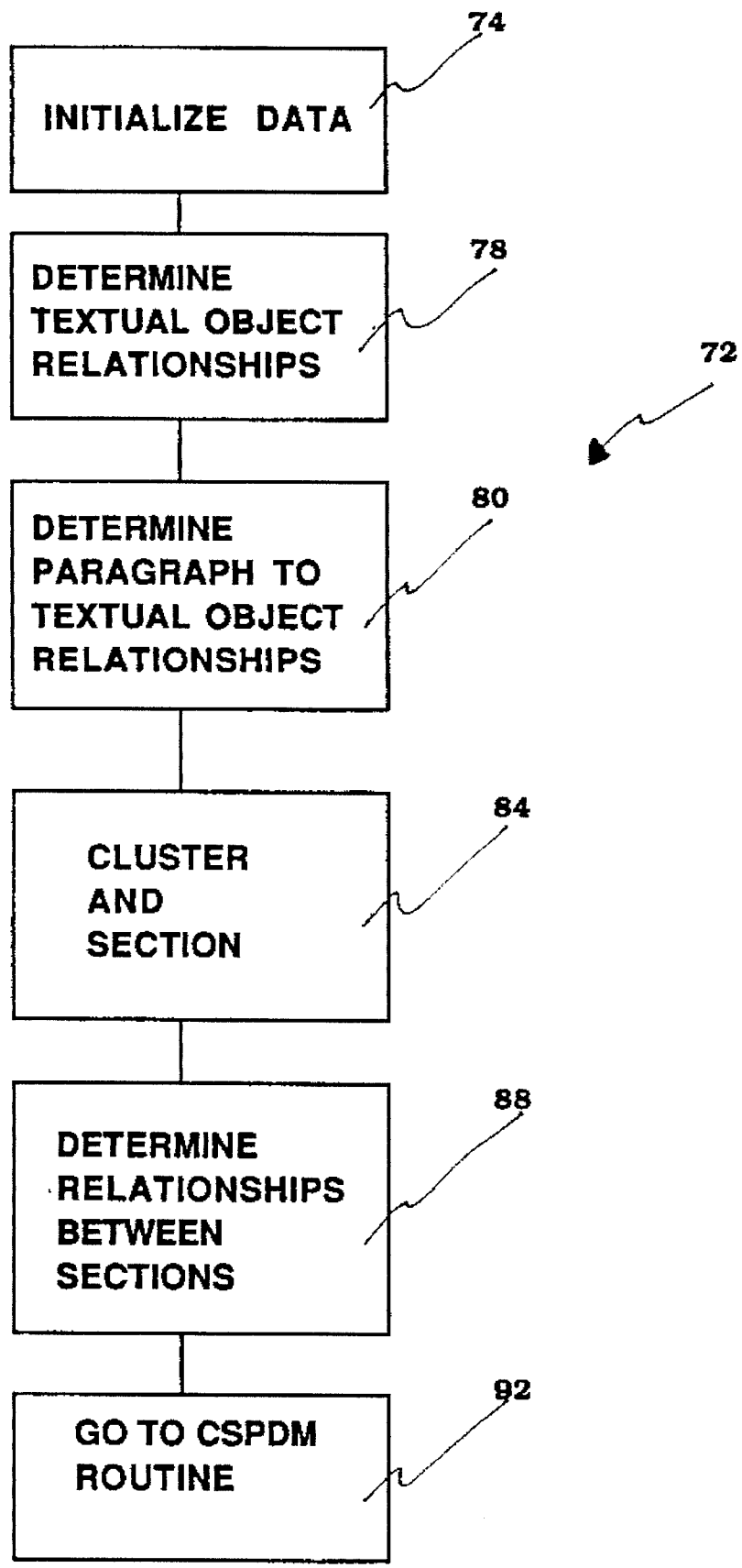
FIG. 3A is a flow chart illustrating a possible sequence of procedures that are executed during the Proximity Indexing Application Program.
Figure 3B:
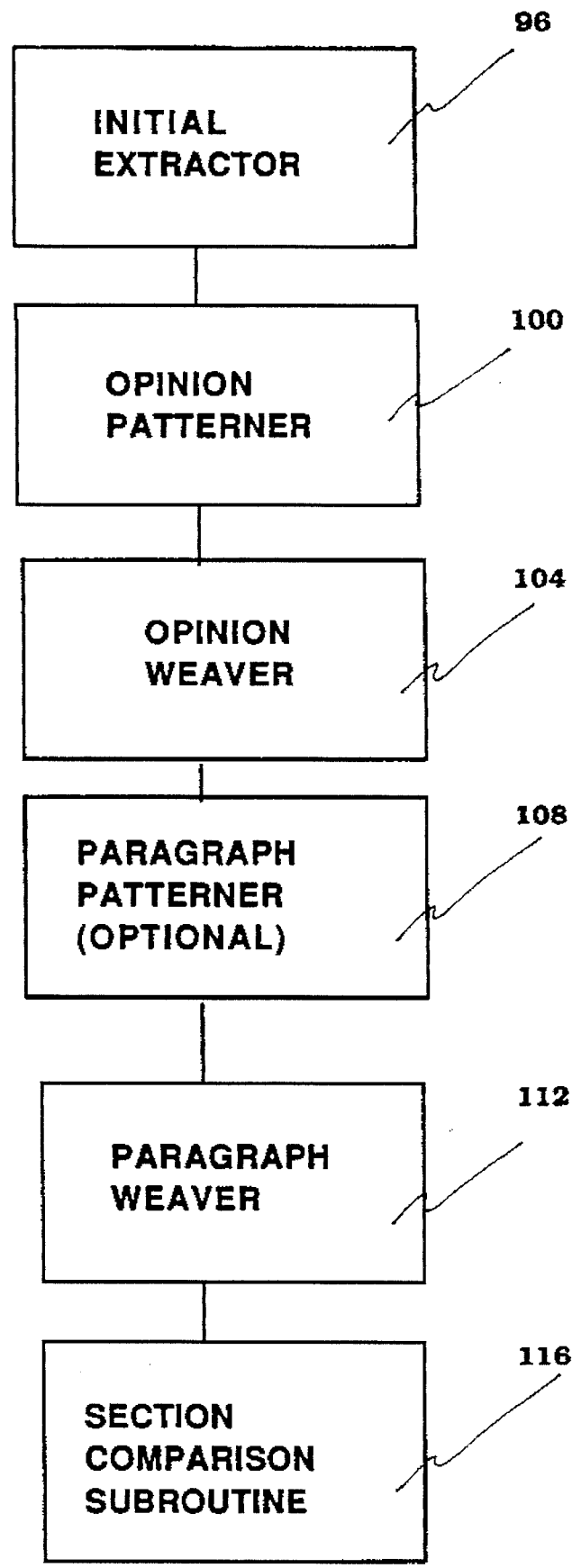
FIG. 3B is a flow chart illustrating a possible sequence of the specific subroutines that are executed during one stage of the Proximity Indexing Application Program. The subroutines are the Initial Extractor Subroutine, Opinion Patterner Subroutine, the Opinion Weaver Subroutine, the Paragraph Patterner Subroutine (Optional), the Paragraph Weaver Subroutine and the Section Comparison Subroutine.
Figure 3C:
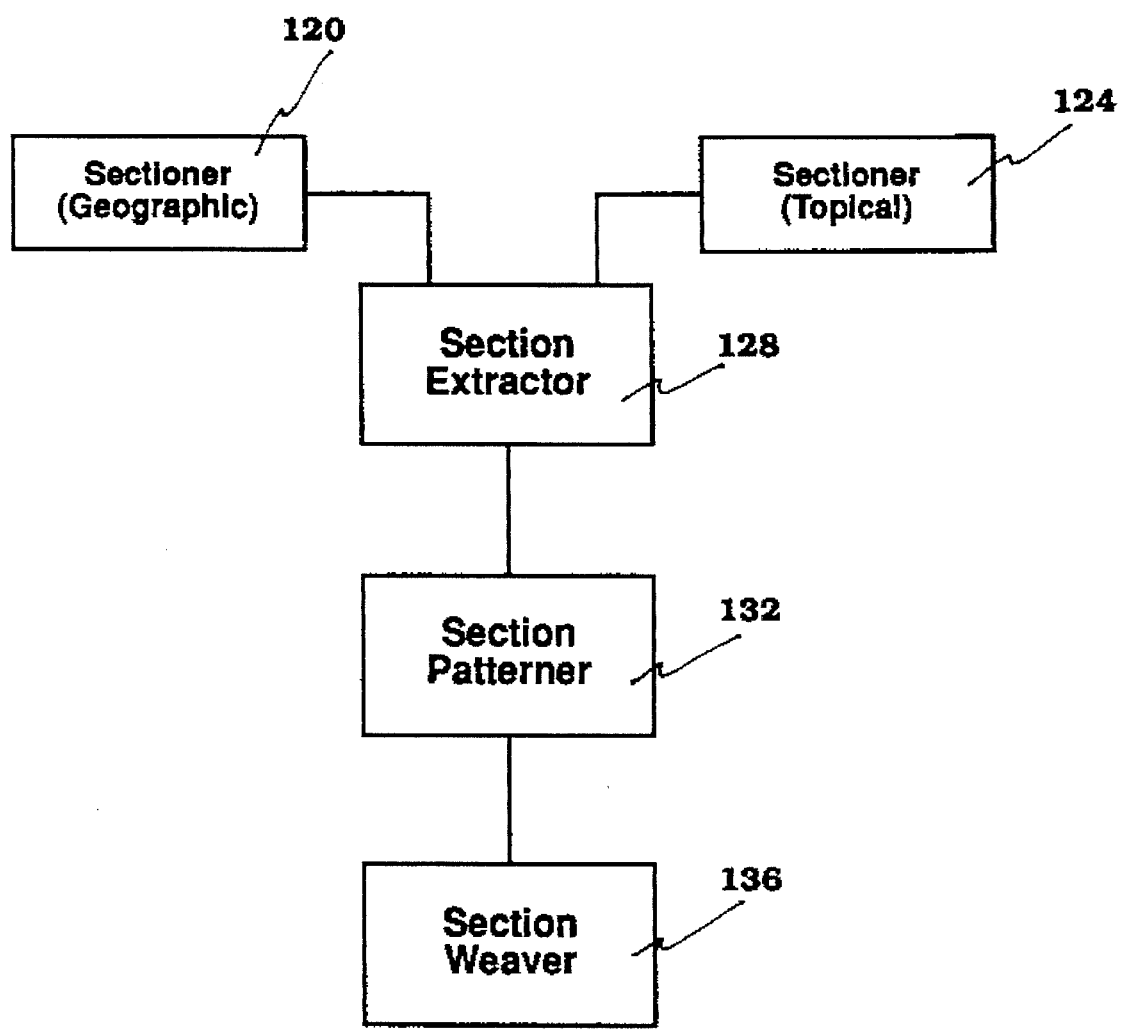
FIG. 3C is flow chart illustrating a possible sequence of subroutines that are executed after the Section Comparison Subroutine. The Section Comparison Subroutine may comprise the Sectioner-Geographic Subroutine and the Section-Topical Subroutine (Optional). The sequence of subroutines executed after the Section Comparison Subroutine are the Section Extractor Subroutine, the Section Patterner Subroutine and the Section Weaver Subroutine.
Figure 3D:
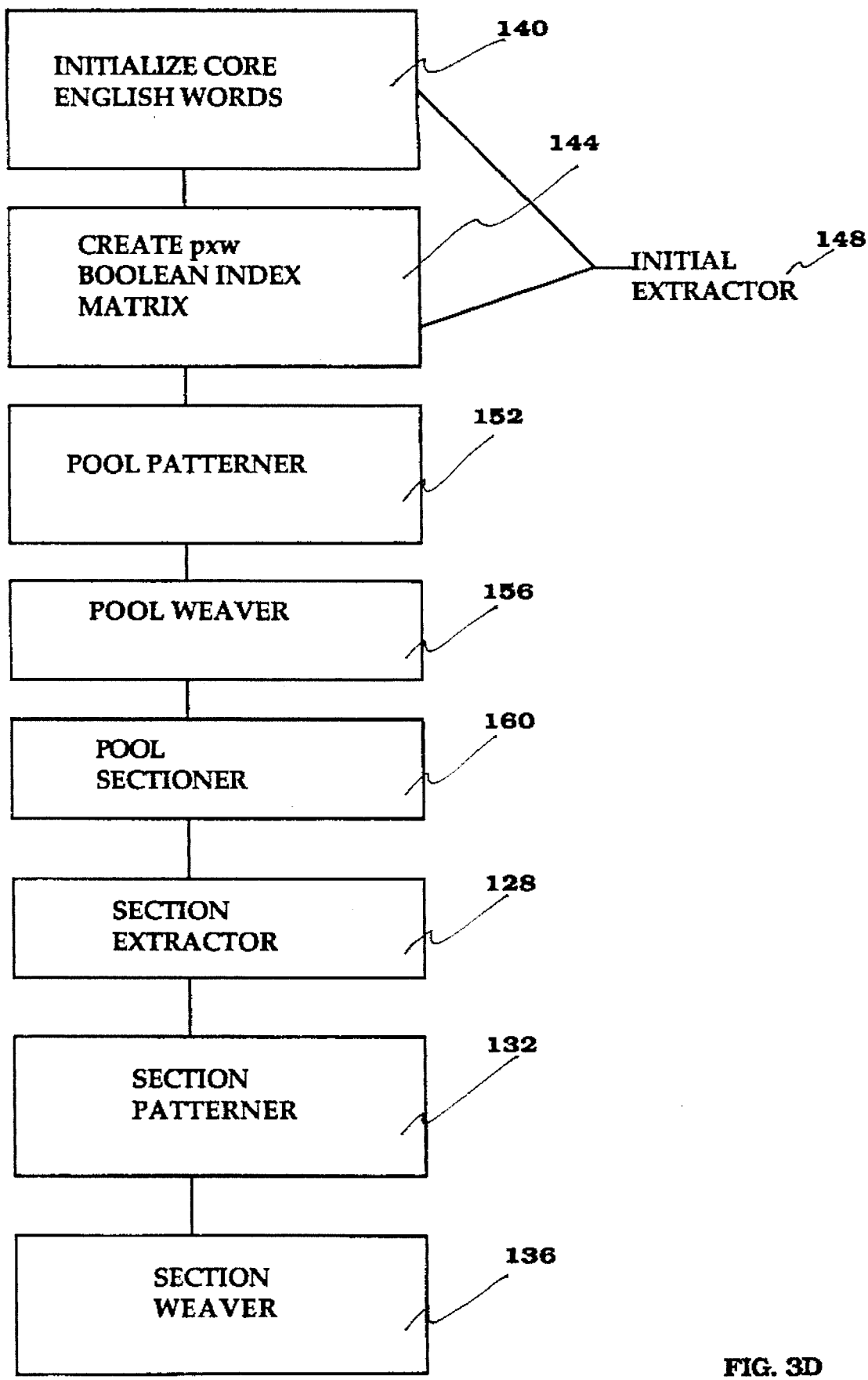
FIG. 3D is a high level flow chart illustrating a possible sequence of subroutines that comprise the Boolean Indexing Subroutine which are executed during another stage of the Proximity Indexing Application Program. The first two subroutines, Initialize Core English Words and Create p×w Boolean Matrix, are executed by the Initial Extractor Subroutine. The results are then run through the Pool-Patterner Subroutine, the Pool-Weaver Subroutine, the Pool-Sectioner Subroutine, the Section-Extractor Subroutine, the Section-Patterner Subroutine and the Section Weaver Subroutine.

FIGS. 3A to 3D depict examples of the preferred procedures and subroutines of a Proximity Indexing Application Program 62, and possible interactions among the subroutines. FIG. 3A depicts a sequence of procedures followed by the Proximity Indexing Application Program 62 to index textual objects for searching by the CSPDM 66. FIG. 3B depicts specific subroutines that the Proximity Indexing Application Program 62 executes to partition full textual objects into smaller sections. FIG. 3C depicts subroutines executed by the Section Comparison Routine of FIG. 3B and subsequent possible subroutines to format and index the sections. FIG. 3D depicts a sequence of subroutines of the Proximity Indexing Application Program 62 which first sections and then indexes these sections of "core english words" 140 contained in the database 54. "core english words" 140 are words that are uncommon enough to somewhat distinguish one textual object from another. The word searches of the CSPDM 66 search these sections of core English words to determine which textual objects to retrieve.

Before describing the Proximity Indexing Application Program 62 in detail, a preliminary description of the Proximity indexing method would be helpful.

"Proximity indexing" is a method of indexing that uses statistical techniques and empirically generated algorithms to organize and categorize data stored in databases. The Proximity Indexing Application Program 62 applies the Proximity indexing method to a database 54. The preferred embodiment of the present invention uses the Proximity Indexing Application Program 62 to Proximity index textual objects used for legal research by indexing objects based on their degree of relatedness—in terms of precedent and topic—to one another.

Applying the method to legal research, the "Proximity indexing" system treats any discrete text as a "textual object." Textual objects may contain "citations," which are explicit references to other textual objects. Any legal textual object may have a number or different designations of labels. For example, 392 U.S. 1, 102 S.Ct 415, 58 U.S.L.W. 1103, etc. may all refer to the same textual object.

Cases are full textual objects that are not subsets of other textual objects. Subsets of a full textual object include words, phrases, paragraphs, or portions of other full textual objects that are referred to in a certain full textual object. (The system does not treat textual objects as subsets of themselves.)

Every case, or "full" textual object, is assigned a counting-number "name"—designated by a letter of the alphabet in this description—corresponding to its chronological order in the database 54. Obviously, textual objects may contain citations only to textual objects that precede them. In other words, for full textual objects, if "B cites A," (i.e. "A is an element of B" or "the set 'B' contains the name 'A'"), textual object A came before B, or symbolically, A<B. Every textual object B contains a quantity of citations to full textual objects, expressed as Q(B), greater than or equal to zero, such that Q(B)<B.

Textual objects other than full textual objects may be subsets of full textual objects and of each other. For example, a section, page, or paragraph of text taken from a longer text may be treated as a textual object. Phrases and words are treated as a special kind of textual object, where Q(w)=0. Sections, pages, and paragraphs are generally subsets of only one full textual object, and may be organized chronologically under the numerical "name" of that full textual object. For purposes of chronology, phrases and words are treated as textual objects that precede every full textual object, and can generally be treated as members of a set with name "0," or be assigned arbitrary negative numbers.

Any two textual objects may be related to each other through a myriad of "patterns." Empirical research demonstrates that eighteen patterns capture most of the useful relational information in a cross-referenced database 54. A list of these eighteen patterns, in order of importance, is attached as Appendix #1. (For a discussion on probability theory and statistics, see Wilkinson, Leland; SYSTAT: The System for Statistics; Evanston, Ill.: SYSTAT Inc., 1989 incorporated herein by reference.) Some patterns occur only between two full textual objects, and others between any two textual objects; this distinction is explained below. Semantical patterning is only run on patterns number one and number two of Appendix #1. For purposes of explaining how patterns are used to generate the Proximity Index, only the two simplest patterns are illustrated.

The simplest, Pattern #1, is "B cites A." See Appendix No. 1. In the notation developed, this can be diagramed: a b c A d e f B g h i where the letters designate textual objects in chronological order, the most recent being on the right, arrows above the text designate citations to A or B, and arrows below the text designate all other citations. The next simplest pattern between A and B, Pattern #2, is "B cites c and A cites c," which can also be expressed as "there exists c, such that c is an element of (A intersect B)." See Appendix No. 1. This can be diagramed: a b c A d e f B g h i. For every textual object c from 0 to (A−1), the existence of Pattern #2 on A and B is signified by 1, its absence by 0. This function is represented as P#2AB(c)=1 or P#2AB(c)=0. The complete results of P#1AB and P#2AB can be represented by an (A)×(1) citation vector designated X.

The functions of some Patterns require an (n)×(1) matrix, a pattern vector. Therefore it is simplest to conceive of every Pattern function generating an (n)×(1) vector for every ordered pair of full textual objects in the database 54, with "missing" arrays filled in by 0s. Pattern Vectors can be created for Pattern #1 through Pattern #4 by just using the relationships among textual object A and the other textual objects in the database 54 and among textual object B and the other textual objects in the database 54. Pattern Vectors for Patterns #5 through #18 can only be created if the relationship of every textual object to every other textual object is known. In other words, Pattern Vectors for Patterns #1 through #4, can be created from only the rows A and B to the Citation Matrix but Pattern Vectors for Patterns #5 through #18 can only be created from the whole Citation Matrix. (See Appendix #1):

(total textual objects c) / (theoretical maximum textual objects c) $[(\underline{x})(\underline{x})^T/\text{TMax}]$, (total textual objects c) / (actual maximum textual objects c) $[(\underline{x})(\underline{x})^T/\text{AMax}]$ frequency of object c per year [f], and the derivative of the frequency [f].

In pattern #2, given that A<B, the theoretical maximum ("TMax") number Q(A intersect B)=A minus 1. The actual maximum possible ("AMax"), given A and B,is the lesser of Q(A) and Q(B). The ratios "$\underline{X}(\underline{X})^T/\text{TMax}$" and "$\underline{X}(\underline{X})^T/\text{AMax}$," as well as the frequency of occurrence of textual objects c per year, f2(A, B), and the first derivative f'2(A, B), which gives the instantaneous rate of change in the frequency of "hits," are all defined as "numerical factors" generated from patterns #1 and #2. These are the raw numbers that are used in the weighing algorithm.

For Pattern #2, the total number of possible textual objects c subject to analysis, (i.e. TMax) is A−1 (one) and is only for the years at issue which are those up to the year in which A occurred. However, a relationship may remain "open," that is, it may require recalculation of f(x) and f'(x) as each new textual object is added to the database 54, (for a total of n cases subject to analysis).

The "numerical factors" for all eighteen patterns are assigned various weights in a weighing algorithm used to generate a scalar F(A, B). The function F generates a scalar derived from a weighted combination of the factors from all eighteen patterns. The patterns are of course also weighted by "importance," allowing Supreme Court full textual objects to impose more influence on the final scalar than District Court full textual objects, for example. The weighing of the more than 100 factors is determined by empirical research to give results closest to what an expert human researcher would achieve. The weighing will vary depending upon the type of material that is being compared and the type of data in the database 54. (See Thurstone. The Vectors of Mind, Chicago, Ill.: University of Chicago Press, 1935, for a description of factor loading and manipulating empirical data incorporated herein by reference.) In a commercial "Proximity Indexer" it will be possible to reset the algorithm to suit various types of databases.

A scalar F(A, B) is generated for every ordered pair of full cases in the database 54, from F(1, 2) to F(n−1, n). F(z,z) is defined as equal to 0.

The full results of F(A,B) are arranged in an (n)×(n) matrix designated F. Note that F(B, A) is defined as equal to F(A, B), and arrays that remain empty are designated by 0. For every possible pairing of cases (A,B), a Euclidean distance D(A,B) is calculated by subtracting the Bth row of Matrix $\underline{F}$ from the Ath row of Matrix $\underline{F}$. In other words:

$$D(A,B)=[(F(1, A)-F(1, B))^2+(F(2, A)-F(2, B))^2+ \ldots +(F(n, A)-F(n, B))^2]^{1/2}.$$

A function designated D(A,B) generates a scalar for every ordered pair (A,B), and hence for every ordered pair of textual objects (A,B) in the database 54. The calculations D(A,B) for every ordered pair from D(1,1) to D(n,n) are then arranged in an (n)×(n) "proximity matrix" $\underline{D}$. Every column vector in $\underline{D}$ represents the relationship between a given case A and every other case in the database 54. Comparing the column vectors from column A (representing textual object A) and column B (representing textual object B) allows one to identify their comparative positions in n-dimensional vector space, and generate a coefficient of similarity, S(A,B), from 0–100%, which is more precise and sophisticated than F(A,B) or D(A,B) alone. A similarity subroutine can run directly on F(A,B). However, the real power of the Proximity Matrix $\underline{D}$ is that it allows one to identify "groups" or "clusters" of interrelated cases.

Through factor loading algorithms, the relationships represented by $\underline{D}$ for "n" cases can be re-represented in a vector space containing fewer than "n" orthogonal vectors. This knowledge can be reflected in S(A,B).

The Proximity Indexing Application Program 62 is an application program that applies the above techniques and algorithms to index and format data to be searched by the CSPDM 66. FIG. 3A describes the overall procedure of the Proximity Application Indexing Program 72. The first stage initializes the data 74 in the database 54. The second stage determines the relationships between full textual objects 78. The third stage determines the relationships between paragraphs of each textual object and each full textual object 80. The fourth stage clusters related paragraphs using factor loading and empirical data and then groups the paragraphs into sections based on such data 84. The fifth stage determines the relationships between the sections 88. In the final stage, the sectioned textual objects are not further processed until commands are received from the CSPDM Routine 92.

The following description of FIG. 3B and FIG. 3C elaborates on this general procedure by describing specific subroutines of the preferred Proximity Application Indexing Program. The following is a step by step description of the operation of the Proximity Index Application Program.

Section A Initial Extractor Subroutine 96:

FIG. 3B describes subroutines for the first portion of the preferred Proximity Indexing Application Program 62. The first subroutine of the Proximity Indexing Applications Program is the Initial Extractor Subroutine 96. The Initial extractor subroutine 96 performs three primary functions: Creation of the Opinion Citation Matrix, creation of the Paragraph Citation Matrix, and creation of Boolean Word Index.

The following steps are performed by the Initial extractor subroutine 96.

1. Number all full textual objects chronologically with arabic numbers from 1 through n.

2. Number all paragraphs in all the full textual objects using arabic numbers from 1 through p.

3. Identify the page number upon which each paragraph numbered in step two above begins.

4. Create Opinion Citation Vectors ($\underline{X}$). By comparing each full textual object in the data base to every other full textual object in the data base that occurred earlier in time.

5. Combine Opinion Citation Vectors to create the bottom left half portion of the n×n Opinion citation matrix.

6. Create a mirror image of the bottom left half portion of the Opinion citation matrix in the top right half portion of the same matrix, to complete the matrix. In this manner only $n^2/2$ comparisons need to be conducted. The other ½ of the comparisons are eliminated.

7. Create the p×n Paragraph Citation Vectors by comparing each paragraph to each full textual object that occurred at an earlier time. This will require (n/2)p searches.

8. Create a Paragraph Citation Matrix by combining Paragraph Citation Vectors to create the bottom left half portion of the matrix.

9. Complete the creation of the Paragraph Citation Matrix by copying a mirror image of the bottom left half portion of the matrix into the top right half portion of the matrix.

10. Initialize the Initial extractor subroutine 96 with a defined set of core English words.

11. Assign identification numbers to the core English words. In the preferred embodiment 50,000 English words are used and they are assigned for identification the numbers from −50,000 to −1.

12. Create a Boolean Index Matrix 144 with respect to the core English words by searching the database 54 for the particular word and assigning the paragraph number of each location of the particular word to each particular word. This procedure is described in greater detail in FIG. 3D.

Section B Opinion Patterner Subroutine 100:

The Opinion Patterner Subroutine 100 performs three primary functions: Pattern analysis on matrices, calculation of the numerical factors and weighing the numerical factors to reach resultant numbers.

13. Process the Opinion Citation Matrix through each of the pattern algorithms contained in appendix #1 for each ordered pair of full textual objects to create opinion pattern vectors for each pattern and for each pair of full textual objects. The pattern algorithms determine relationships which exist between the ordered pair of textual objects. (See Appendix #1) The first four pattern algorithms can be run utilizing just the Opinion Citation Vector for the two subject full textual objects. Each pattern algorithm produces a opinion pattern vector as a result. The fifth through eighteenth pattern algorithms require the whole Opinion Citation Matrix to be run through the Opinion Patterner Subroutine 100.

14. Calculate total hits (citation) for each pattern algorithm. This can be done by taking the resultant opinion pattern vector (OPV) and multiplying it by the transposed opinion pattern vector $(OPV)^T$ to obtain a scalar number representing the total hits.

15. Calculate the theoretical maximum number of hits. For example, in the second pattern of Appendix #1, the theoretical maximum is all of the full textual objects that occur prior in time to case A (A−1).

16. Calculate the actual maximum number of hits. For example, in the second pattern of Appendix #1, the actual maximum possible number of hits is the lesser of the number of citations in full textual object Q(A) or full textual object Q(B).

17. Calculate the total number of hits (citations) per year. This is labeled f(A,B).

18. Calculate the derivative of the total change in hits per year. This is the rate of change in total hits per year and is labeled f'(A,B).

19. Calculate the ratio of total hits divided by theoretical max $[(oPV)(oPV)^{t/TMAX}]$.

20. Calculate the ratio of the total hits divided by the actual maximum $[(oPV)(oPV)^t{}_{/AMAX}]$.

21. Calculate a weighted number F(A,B) which represents the relationship between full textual object A and full textual object B. The weighted number is calculated using the four raw data numbers, two ratios and one derivative calculated above in steps 14 through 20 for each of the 18 patterns. The weighing algorithm uses empirical data or loading factors to calculate the resulting weighted number.

22. The Opinion Patterner Subroutine 100 sequence for the Opinion Citation Matrix is repeated n−1 times to compare each of the ordered pairs of full textual objects. Therefore, during the process, the program repeats steps 13 through 21, n−1 times.

23. Compile the Opinion Pattern Matrix by entering the appropriate resulting numbers from the weighing algorithm into the appropriate cell locations to form an n×n Opinion Pattern Matrix.

Section C The Opinion Weaver Subroutine 104:

The Opinion Weaver Subroutine 104 performs two primary tasks: calculation of the Opinion Proximity Matrix and calculation of the Opinion Similarity Matrix. The Opinion Proximity Matrix D is generated by calculating the Euclidean Distance between each row A and B of the Opinion Pattern Matrix (D(A,B)) for each cell DC(A,B ). The Opinion Similarity Matrix is generated by calculating the similarity coefficient from 0 to 100 between each row A and B of the Opinion Proximity Matrix (S(A,B)) in each cell SC(A,B) in matrix S.

24. Calculate the n×n Opinion Proximity Matrix. To calculate D(A,B) the program takes the absolute Euclidian distance between column A and column B of the n×n Opinion Pattern Matrix. The formula for calculating such a distance is the square root of the sum of the squares of the distances between the columns in each dimension, or:

$$D(A,B)=[(F(1,A)-F(1,B))^2+(F(2,A)-F(2,B))^2+\ldots+(F(N,A)F(N,B))^2]^{1/2}$$

The Opinion Proximity Matrix created will be an n×n matrix. The smaller the numbers in the Opinion Proximity Matrix the closer the relationship between full textual object A and full textual object B.

25. Create n×n Opinion Similarity Matrix. To calculate the Opinion Similarity Matrix each scalar number in the Opinion Proximity Matrix is processed through a coefficient of similarity subroutine which assigns it a number between 0 and 100. By taking the coefficient of similarity, the program is able to eliminate full textual objects which have Euclidian distances that are great. (For example, a Euclidean distance that is very large and is run through the coefficient of similarity would result in a very low coefficient of similarity. Euclidean distances resulting in similarities below four are eliminated in the preferred embodiment).

Section D Paragraph Patterner Matrix Subroutine 108 (Optional):

26. Obtain the p×n Paragraph Citation Matrix calculated by the Initial extractor subroutine 96.

27. Run each ordered pair of rows of the p×n Paragraph Citation Matrix for an individual full textual object i through the pattern algorithms number one and two (see appendix #1) and determine the resultant Paragraph Pattern Vector.

28. Calculate the various numerical factors (AMax, TMax, etc.) by evaluating the values in the Paragraph Pattern Vector.

29. Run the Paragraph Pattern Vector and the numerical factors through the weighing algorithm to determine the appropriate value for each cell of the $c_i \times n$ Partial Paragraph Pattern Matrix where $c_i$ is the number of paragraphs in full textual object i.

30. Repeat steps 27 through 29 for each full textual object i where i=1 to n, to create the p×n Paragraph Pattern Matrix.

Section E Paragraph Weaver Subroutine 112:

31. Calculate the Euclidean distance of each ordered pair of rows of either the p×n Paragraph Citation Matrix or the p×n Paragraph Pattern Matrix for a single full textual object i.

32. Place the resultant Euclidean distance values in the appropriate cell of the $c_i \times c_i$ Paragraph Proximity Matrix where $c_i$ is the number of paragraphs in full textual object i, where $0<i<n+1$.

33. Repeat steps 31 through 32 n times in order to calculate n different Paragraph Proximity Matrices (one for each full textual object i).

34. The Section Comparison Subroutine 116 clusters all p paragraphs in the database 54 into sections. Then the sections are compared and indexed in the database 54. This procedure is described in greater detail in FIG. 3C.

FIG. 3C depicts possible subroutines that the Section Comparison Subroutine 116 comprises. The subroutines are the Sectioner Geographical Subroutine 120, the Sectioner Topical Subroutine 124 (Optional), the Section Extractor Subroutine 128, the Section Patterner Subroutine 132 and the Section Weaver Subroutine 163.

Section F Sectioner Geographical Subroutine 120:

35. For each full texual object i, the Sectioner Geographical Subroutine 120 uses the corresponding $c_i \times c_i$ Paragraph Proximity Matrix and a contiguity factor for each paragraph to determine which paragraphs may be clustered into sections. Sections are made up of continuous paragraphs that are combined based upon weighing their Euclidean distances and contiguity.

36. Repeat step 35 for all n full textual objects until all p paragraphs are grouped into q sections.

Section H Sectioner Topical Subroutine 124 (Optional):

37. The Sectioner Topical Subroutine 124 provides additional assistance to the Sectioner Geographical Subroutine 120 by considering the factor of topical references to determine the q sections.

38. For the total number of discrete references "z" to each full textual object in a particular full textual object, a $z \times z$ Citation Proximity Matrix is formed by comparing the Euclidean distances between each reference to a full textual object contained in each paragraph and calculating the topical weight given to each paragraph.

Section I Section Extractor Subroutine 128:

39. The Section Extractor Subroutine 128 numbers each section created by the Sectioner Subroutines from 1 to q.

40. The Sectioner Extractor Subroutine 128 creates a $q \times q$ Section Citation Matrix by determining which sections refer to every other section.

Section J Section Patterner Subroutine 132:

41. The Section Patterner Subroutine 132 then calculates 18 Section Pattern Vectors corresponding to each row of the $q \times q$ Section Citation Matrix using the 18 pattern algorithms in appendix #1.

42. From the Section Pattern Vectors, the numerical factors (AMax, TMax, etc.) are calculated.

43. The weighing algorithm evaluates the numerical factors and the Section Pattern Vectors and determines the values for each cell of the $q \times q$ Section Pattern Matrix.

Section K Section Weaver Subroutine 163:

44. The Section Weaver Subroutine 163 calculates the Euclidean distances between each row of the $q \times q$ Section Pattern Matrix and creates a $q \times q$ Section Proximity Matrix.

45. The Section Weaver Subroutine 163 then creates a $q \times q$ Section Similarity Matrix with coefficients 0 to 100 using the values of the Section Proximity Matrix and empirical data and factor loading.

Section L Semantical Clustering of a Boolean Index Routine:

FIG. 3D depicts a possible Semantical Clustering of a Boolean Index Routine. (See Hartigan, J. A. *Clustering Algorithms.* New York: John Wiley & Sons, Inc., 1975, for detailed description of clustering algorithms incorporated herein by reference.) The Semantical Clustering routine indexes the textual objects according to the similarity of phrases and words contained within each textual object in a database 54. The routine comprises seven possible subroutines: the Opinion Extractor Subroutine, the Pool Patterner Subroutine 152, the Pool Weaver Subroutine, the Pool Sectioner Subroutine 160, the Section Extractor, the Section Patterner Subroutine 132 and the Section Weaver Subroutine 163. In fact, it is quite possible, using only semantical statistical techniques, to "Proximity-index" documents that do not refer to one another at all based on their Boolean indices.

Section M Opinion Extractor Subroutine:

46. As described in steps 10 and 11, the Opinion Extractor Subroutine initializes a set of core English words and assigns each word a number. The preferred embodiment uses 50,000 discrete core English words and assigns each discrete core English word a number from −50,000 to −1.

47. The Opinion Extractor Subroutine then converts the core English words into a $p \times w$ matrix. The number of columns (w) represents the number of discrete core English words in the database 54 and the number of rows (p) represents the number of paragraphs in the database 54.

48. The Opinion Extractor Subroutine fills the $p \times w$ matrix by inserting a "1" in the matrix cell where a certain paragraph contains a certain word.

Section N Pool Patterner Subroutine 152:

49. The Pool Patterner Subroutine 152 creates two pattern algorithm vectors for only the first two patterns in appendix #1 and determines values for the total number of hits, the theoretical maximum number of hits, the actual maximum number of hits, the total number of hits per year and the derivative of the total number of hits per year.

50. The weighing algorithm of the Pool Patterner Subroutine 152 uses empirical data and factor loading to determine values to enter into a $p \times w$ Paragraph/Word Pattern Matrix.

51. The Pool Patterner Subroutine 152 creates a $p \times w$ Paragraph/Word Pattern Matrix by filling the appropriate cell of the Matrix with the appropriate value calculated by the weighing algorithm.

52. The Pool Patterner Subroutine 152 creates a $p \times w$ Paragraph/Word Proximity Matrix taking the Euclidean distance between the rows of the Paragraph/Word Pattern Matrix.

Section O Pool Sectioner Subroutine 160:

53. The Pool Sectioner Subroutine 160 evaluates the Euclidean distances in the Paragraph/Word Proximity Matrix and the contiguity factor of each paragraph to duster the paragraphs (p) into a group of (v) sections and create a $v \times w$ Preliminary Cluster Word Matrix.

Section P Section Extractor Subroutine 128:

54. The Section Extractor Subroutine 128 numbers each section chronologically and creates a $v \times v$ Section Word Citation Matrix.

Section Q Section Patterner Subroutine 132:

55. The Section Patterner Subroutine 132 evaluates the $v \times v$ Section Word Citation Matrix to create two word pattern vectors for only the first two patterns algorithms in appendix #1 and determines numerical factors for the total number of hits, the theoretical maximum number of hits, the actual maximum number of hits, the total number of hits per year and the derivative of the total number of hits per year.

56. The Weighing algorithm uses empirical data and factor loading to weigh the numerical factors created from the word pattern vectors and uses the numerical factors and the word pattern vectors to determine values to enter into a $v \times v$ Section Word Pattern Matrix.

Section R Section Weaver Subroutine 136:

57. The Section Weaver Subroutine 136 creates a v×v Section Word Proximity Matrix by taking the Euclidean distance between the rows of the Section Word Pattern Matrix and placing the appropriate Euclidean distance value in the appropriate cell of the Section Word Proximity Matrix.

58. The Section Weaver Subroutine 136 create a v×v Section Word Similarity Matrix by evaluating the Euclidean distances from the Section Word Proximity Matrix and empirical data, and calculating the similarity coefficient for each ordered pair of sections, and places the value in the appropriate cell of the Section Word Similarity Matrix.

59. The Pool Searches of the CSPDM 66 evaluate the Section Word Similarity Matrix as well as other matrices to determine whether or not to retrieve a full textual object.

Figure 4A:
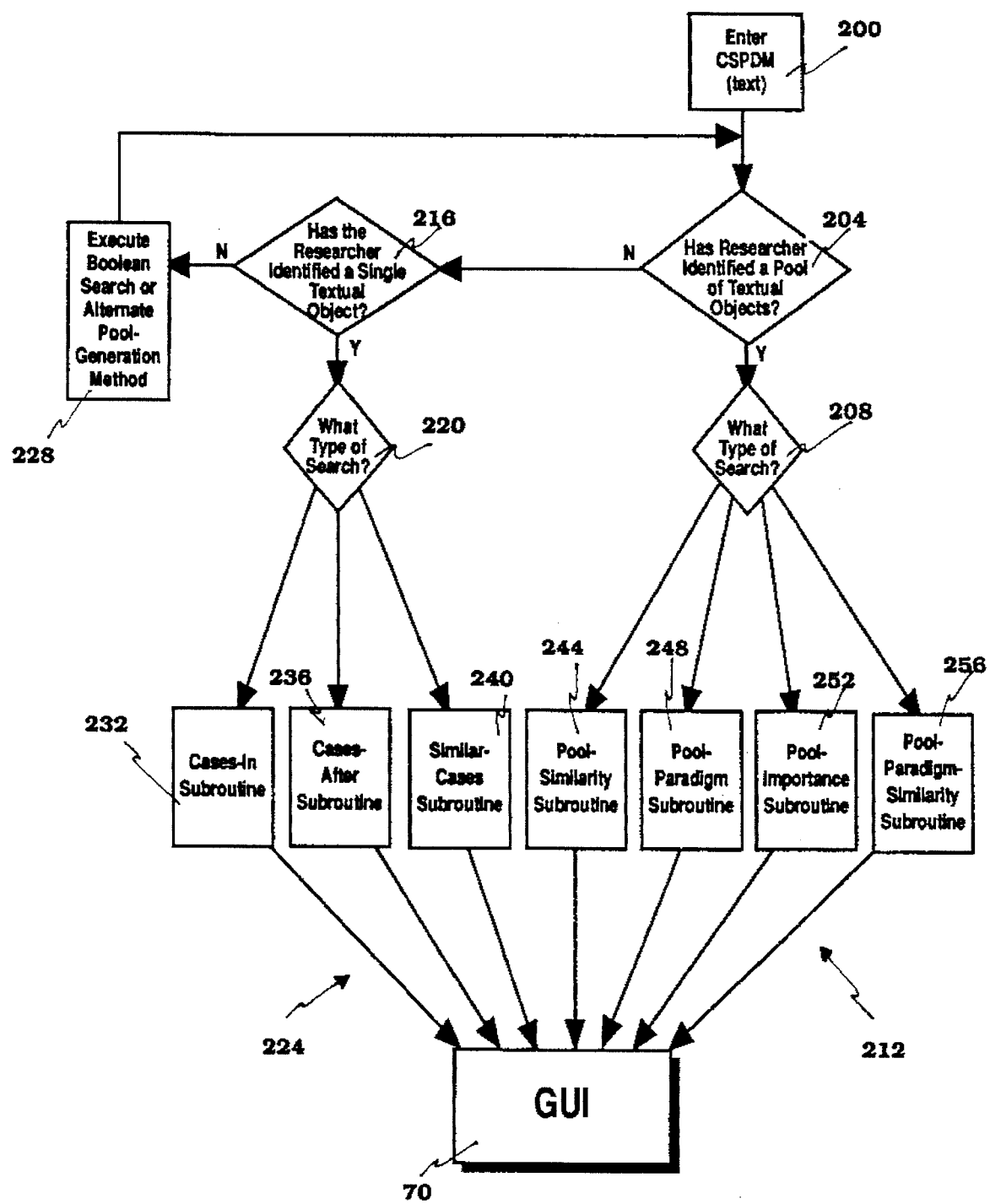
FIG. 4A is a high level diagram illustrating the flow of various search routines depending on the type of search initiated by the user by inputing commands to the Computer Processor via the input means. The diagram further illustrates the interaction between the CSPDM and the GUI Program.
Figure 4B:
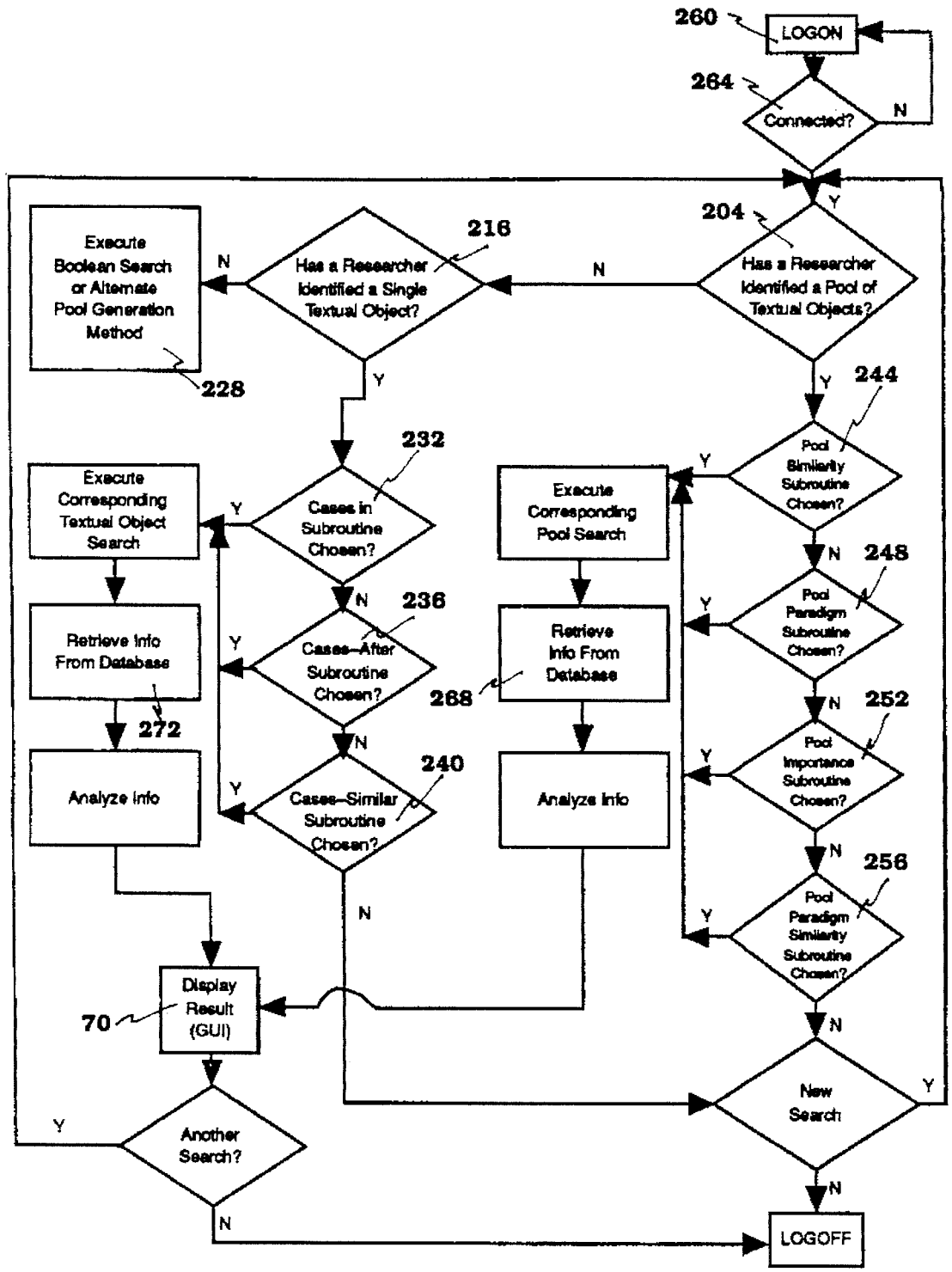
FIG. 4B is a high level flow chart illustrating the sequence of subroutines in the CSPDM program and user interactions with the subroutines.

FIGS. 4A and 4B are high level flow charts that illustrate the general flow of the subroutines of the CSPDM 66. FIG. 4A illustrates that the flow of various search routines depend on the type of search initiated by the researcher. The diagram further illustrates the interaction between the CSPDM 66 and the GUI Program 70. FIG. 4B illustrates the sequence of subroutines in the CSPDM 66 program and the user interactions with the subroutines. FIG. 4B further shows that the researcher can access the different search subroutines and use information that the researcher has already received to find new information.

FIG. 4B provides a high level flow chart illustrating the sequence of subroutines in the CSPDM 66 program and the researcher's interactions with the subroutines. Assuming that the database 54 the researcher desires to access has been proximity indexed, the researcher must log on 260 to the database 54. By entering the appropriate information into the Computer Processor 30 via the input means, the researcher electronically accesses 264 the database 54 and enables the CSPDM 66 to search 200 the database 54.

FIGS. 4A and 4B both show the preliminary options that the researcher can choose from before selecting one of the searching subroutines of the CSPDM 66. The CSPDM 66 questions the researcher on whether the researcher has identified a pool of textual objects 204. If the researcher has selected a pool of textual objects 204, then the researcher is able to choose one of the pool search 208 subroutines 212. If the researcher has not selected a pool of textual objects, the CSPDM 66 questions the researcher on whether the researcher has selected a single textual object 216. If the researcher has selected a single textual object 216, then the researcher is able to choose one 220 of the textual object searches 224. If the researcher has not selected either a pool of textual objects 204 or a single textual object 216, then the researcher must execute a Boolean Word Search or alternate Pool-Generation Method 228 to retrieve textual objects 268, 272.

After CSPDM 66 subroutine has executed a particular search, the CSPDM 66 retrieves the appropriate data from the database 54, analyzes the data, and sends the data to the GUI Program 70 in order for the GUI Program 70 to display the results of the search on the display 38.

FIG. 4B illustrates that after the CSPDM 66 has completed the above procedure, the researcher has the option to exit the CSPDM 66 by logging off, executing a search based on the results of a previous search, or executing a new search.

FIGS. 4A and 4B also depict the seven subroutines of the CSPDM 66. There are three textual object search subroutines 224 and four pool search subroutines 212. The three textual object search subroutines 224 are: the Cases-In Subroutine 232, the Cases-After Subroutine 236 and the Cases-Similar Subroutine 240. The four pool search subroutines 212 are the Pool-Similarity Subroutine 244, the Pool-Paradigm Subroutine 248, the Pool-Importance Subroutine 252, and the Pool-Paradigm-Similarity Subroutine 256. Each of these subroutines are described in more detail in FIGS. 4C to 4I. The following is a step by step description of the subroutines 224, 212 of the CSPDM 66.

Figure 4C:
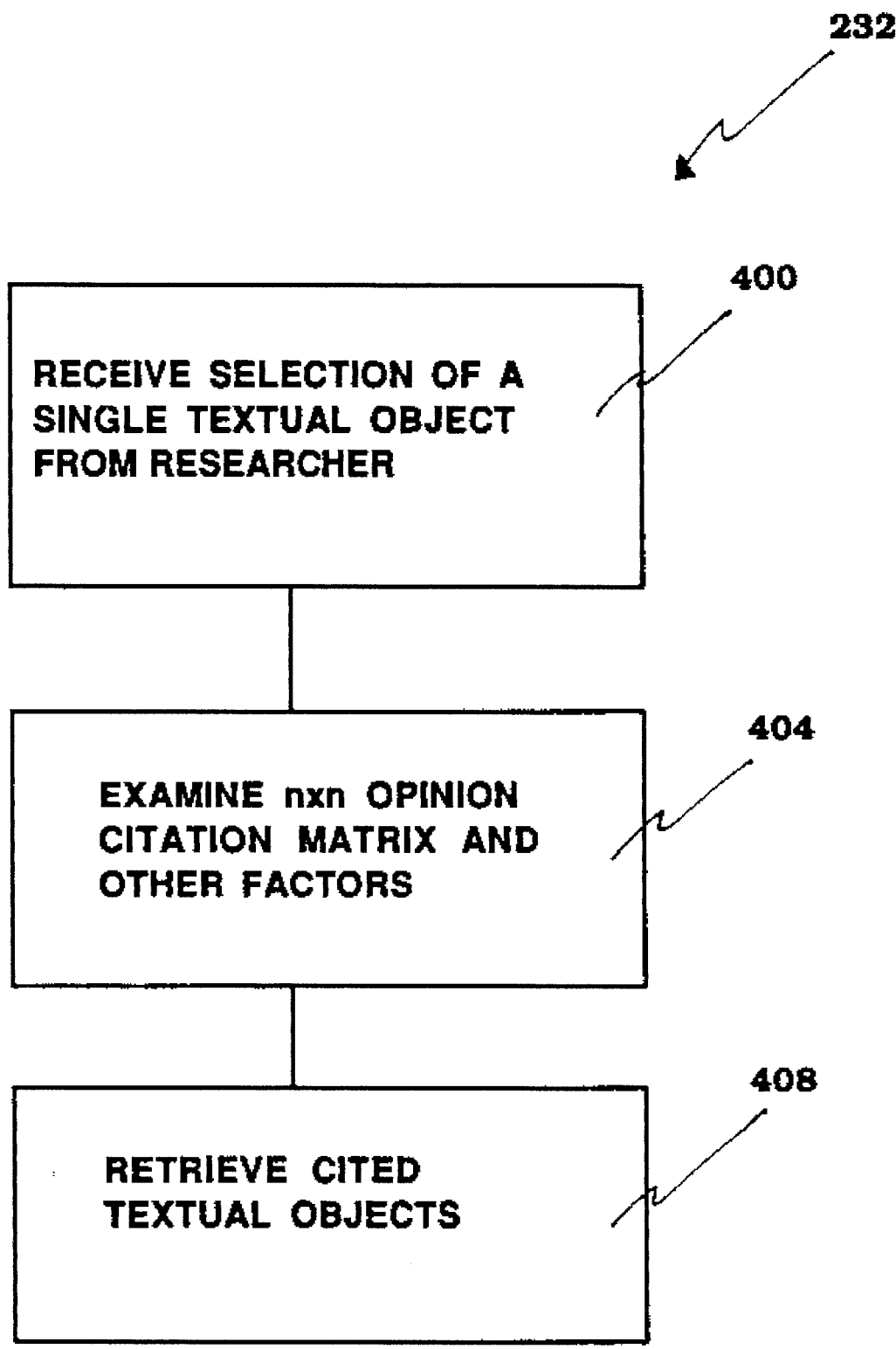
FIG. 4C is a high level flow chart for the Cases-In Subroutine.

Section A Cases-In Subroutine 232:

FIG. 4C is a high level flow chart for the Cases-In Subroutine 232.

1. The researcher must select a single textual object 400.
2. The researcher selects the Cases-In Subroutine 232 option.
3. The Cases-In Subroutine 232 examines the n×n Opinion Citation Matrix and other matrices 404 created by the Proximity Indexing Application Program 62 and retrieves the textual objects to which the selected textual object refers 408, data relating to the number of times the selected textual object refers to the retrieved textual objects, data relating to the importance of each textual object, and other relevant data.

Figure 4D:
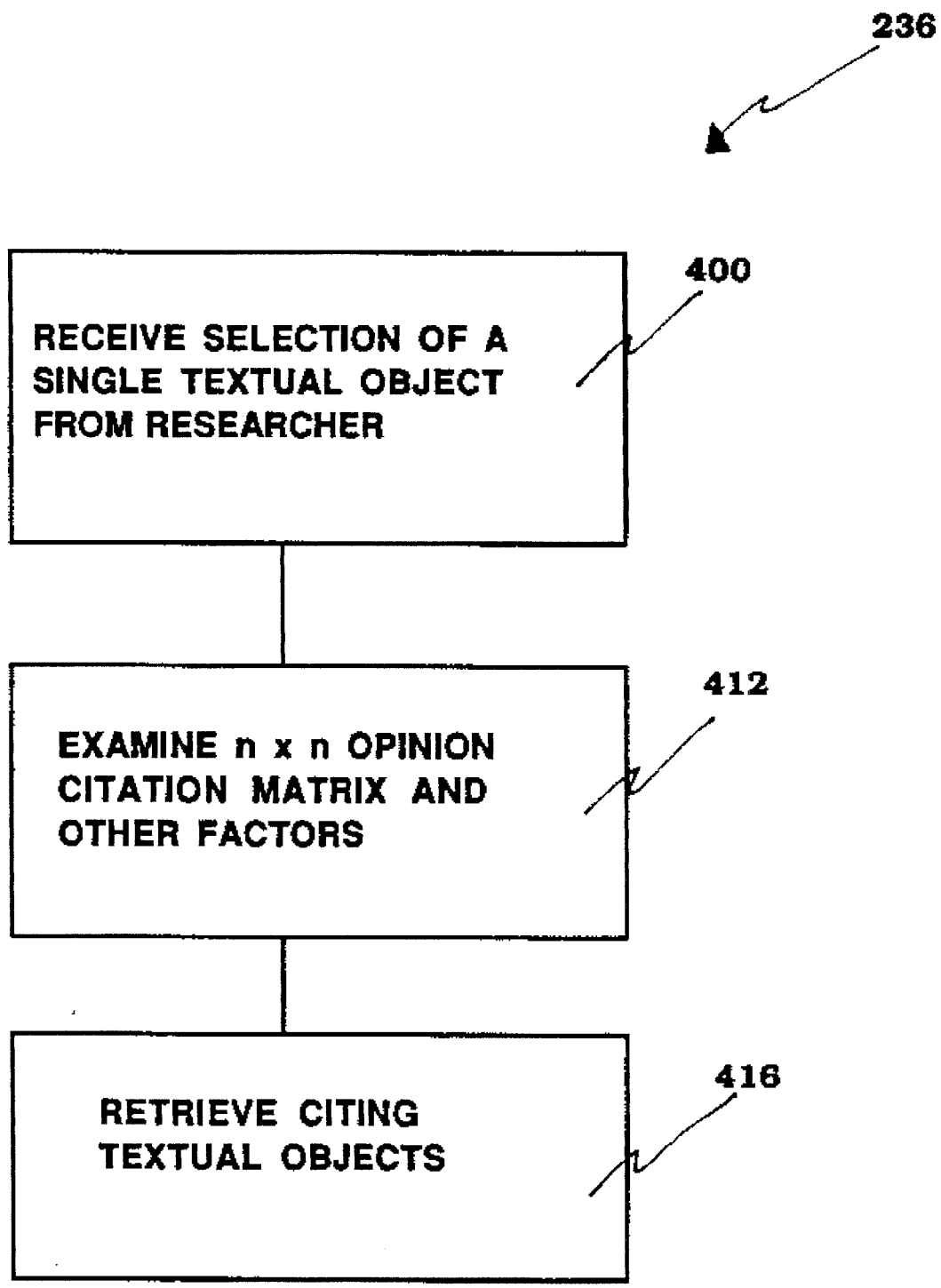
FIG. 4D is a high level flow chart for the Cases-After Subroutine.

Section B Cases-After Subroutine 236:

FIG. 4D is a high level flow chart for the Cases-After Subroutine 236.

4. The researcher must select a single textual object 400.
5. The researcher selects the Cases-After Subroutine 236 option.
6. The Cases-After Subroutine 236 examines the n×n Opinion Citation Matrix and other matrices 412 created by the Proximity Indexing Application Program 62 and retrieves the textual objects that refer to the selected textual object 416, data relating to the number of times the retrieved textual objects refer to the selected textual object, data relating to the importance of each textual object, and other relevant data.

Figure 4E:
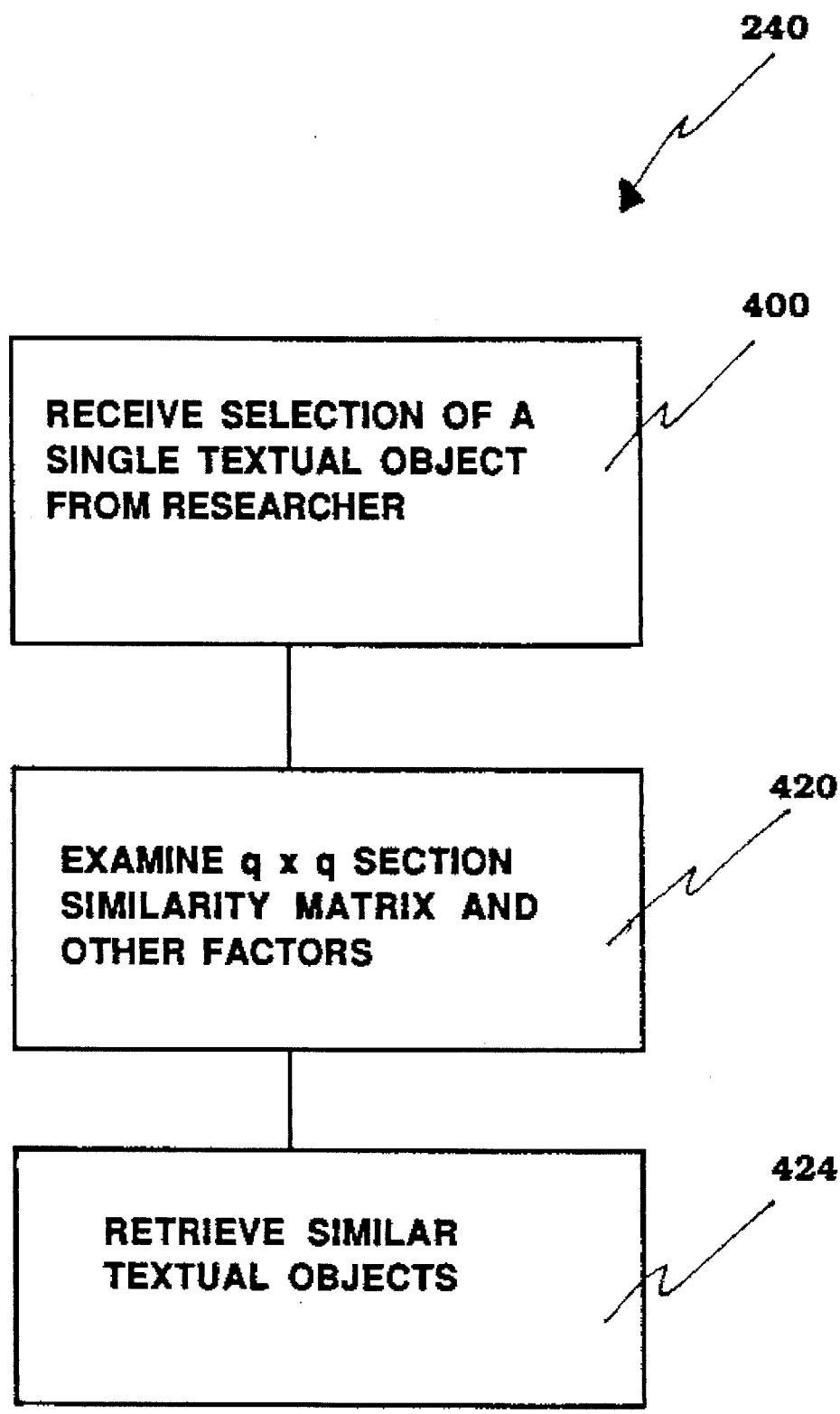
FIG. 4E is a high level flow chart for the Similar-Cases Subroutine.

Section C Similar-Cases Subroutine 240:

FIG. 4E is a high level flow chart for the Similar-Cases Subroutine 240.

7. The researcher must select a single textual object 400.
8. The researcher selects the Similar-Cases Subroutine 240 option.
9. The Similar-Cases Subroutine examines the q×q Section Similarity Matrix and other matrices 420 created by the Proximity Indexing Application Program 62 and retrieves the textual objects that are similar to the selected textual object 424, data relating to the degree of similarity between the selected textual object and the retrieved textual objects, data relating to the importance of each textual object, and other relevant data. In order to be retrieved, a textual object must have a similarity coefficient with respect to the selected textual object of at least a minimum value. The preferred embodiment sets the minimum similarity coefficient to four percent (4%).

Figure 4F:
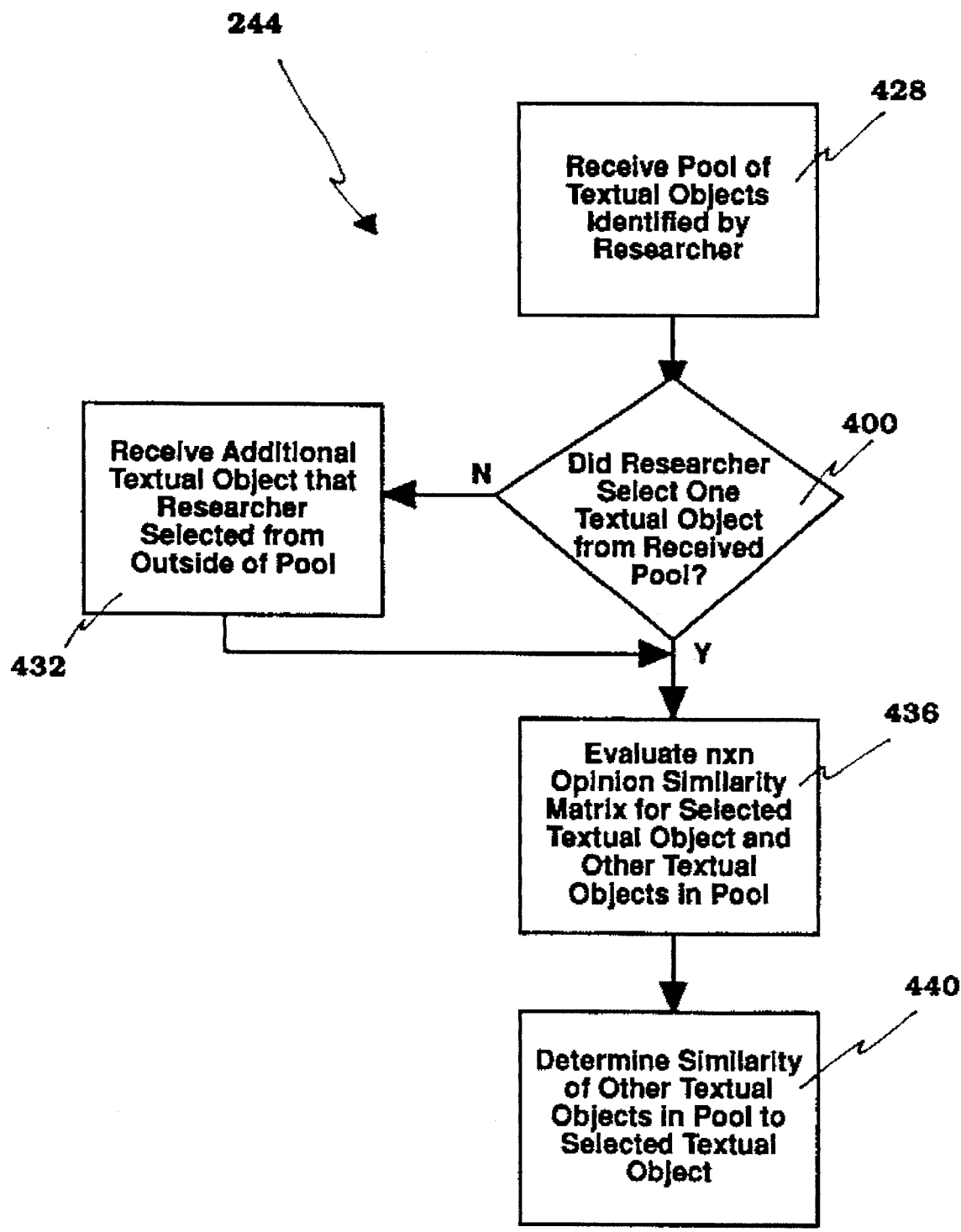
FIG. 4F is a high level flow chart for the Pool-Similarity Subroutine.

Section D Pool-Similarity Subroutine 244:

FIG. 4F is a high level flow chart for the Pool-Similarity Subroutine 244.

10. The researcher must select a pool of full textual objects 428.
11. The researcher must then select a single full textual object 400 to compare with the pool of full textual objects. It should be noted that the researcher can select the single textual object from the selected pool of textual objects, or the researcher can select a textual object from outside of the pool 432.
12. The Pool-Similarity Subroutine 244 examines the n×n Opinion Similarity Matrix and other matrices 436 and values created by the Proximity Indexing Application Program 62 for the selected full textual object and the pool of full textual objects.

13. The Pool-Similarity Subroutine 244 determines the degree of similarity of other full textual objects in the pool to the selected full textual object 440.

Figure 4G:
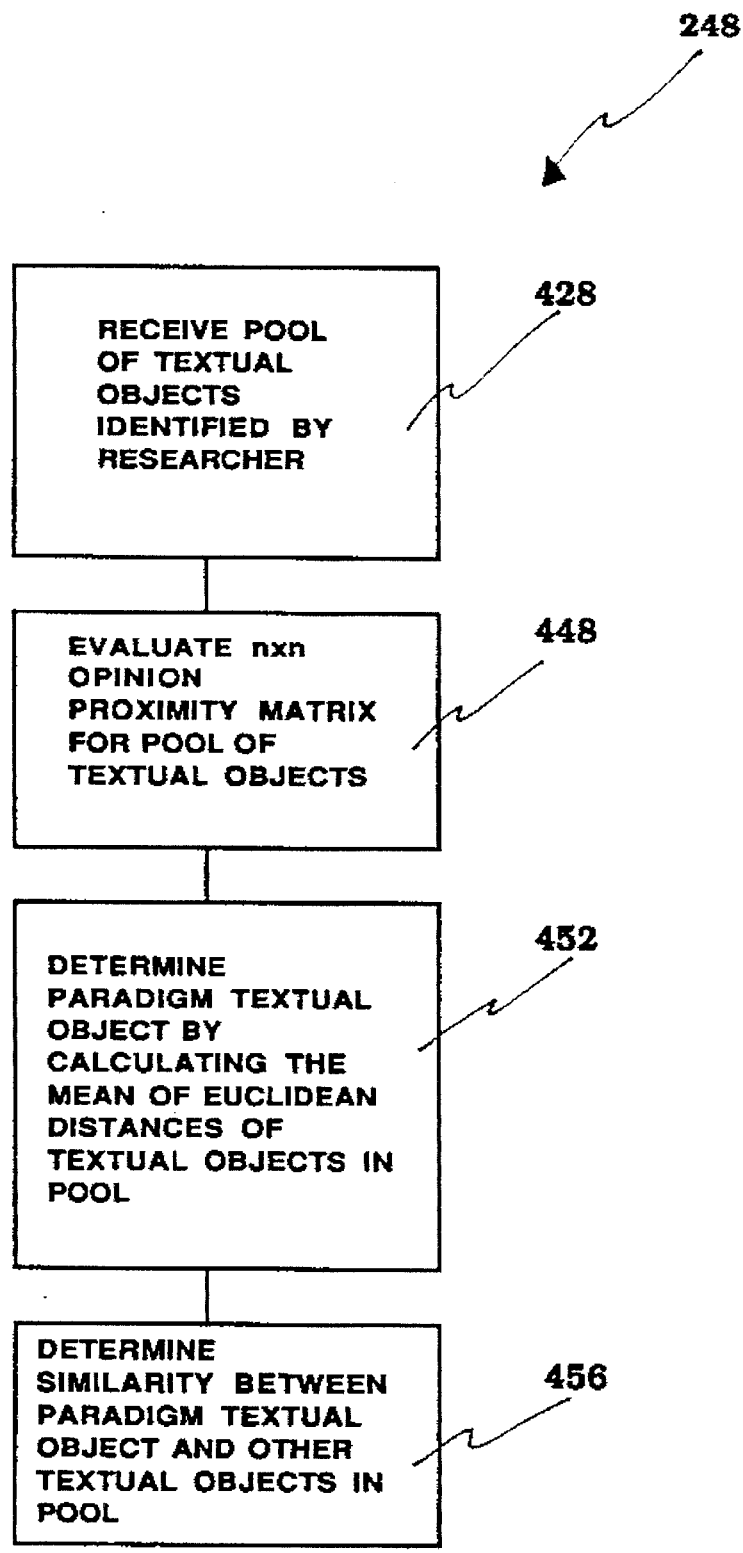
FIG. 4G is a high level flow chart for the Pool-Paradigm Subroutine.

Section E Pool-Paradigm:

FIG. 4G is a high level flow chart for the Pool-Paradigm Subroutine 248.

14. The researcher must select a pool of full textual objects 428.

15. The Pool-Paradigm Subroutine 248 examines the n×n Opinion Proximity Matrix, the n×n Opinion Similarity Matrix and other matrices and values created by the Proximity Indexing Application Program 62 for the pool of full textual objects 448.

16. The Pool-Paradigm Subroutine 248 determines the Paradigm full textual object by calculating the mean of the Euclidean distances of all the textual objects in the pool 452.

17. The Pool-Paradigm Subroutine 248 determines the similarity of the other full textual objects in the pool to the Paradigm full textual object 456.

Figure 4H:
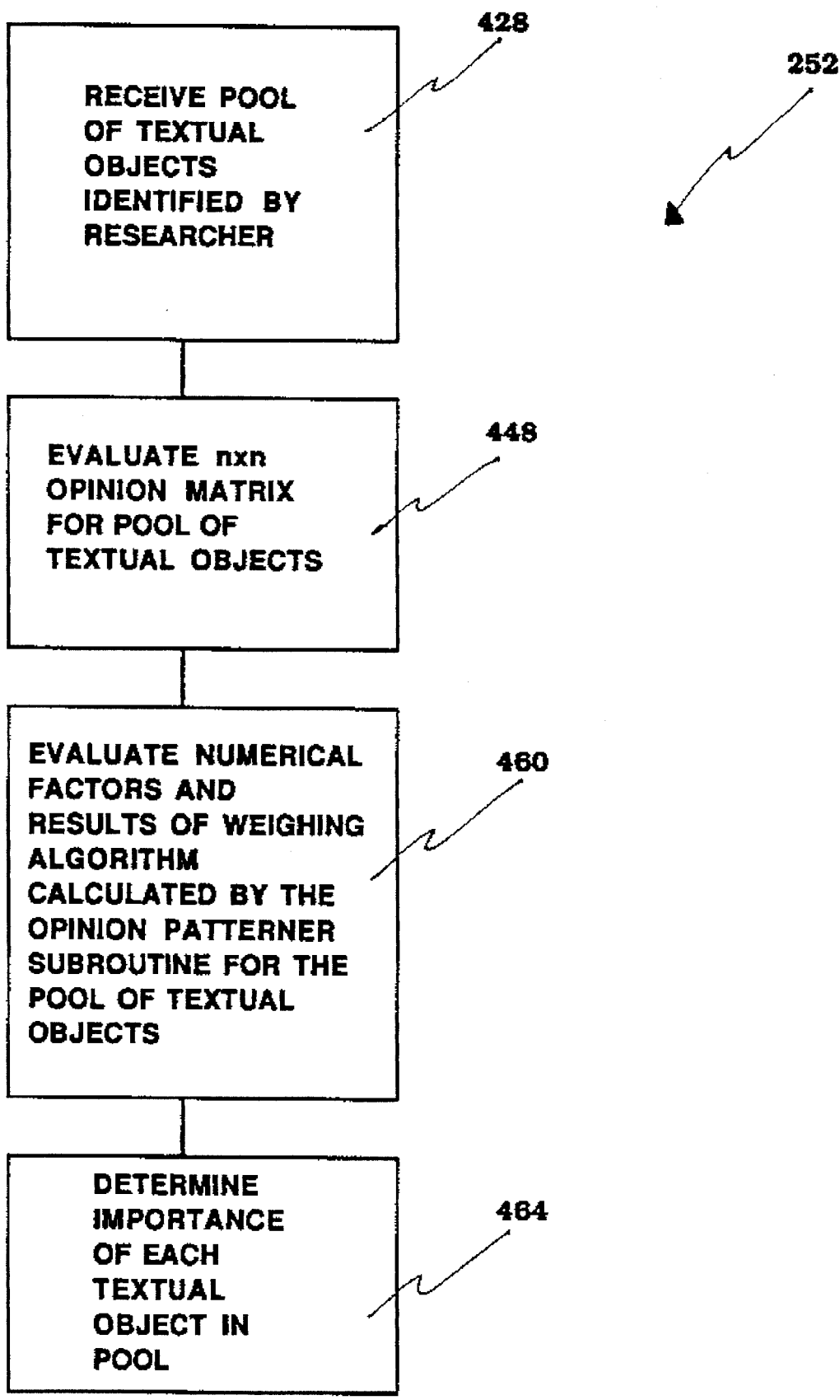
FIG. 4H is a high level flow chart for the Pool-Importance Subroutine.
Figure 14I:
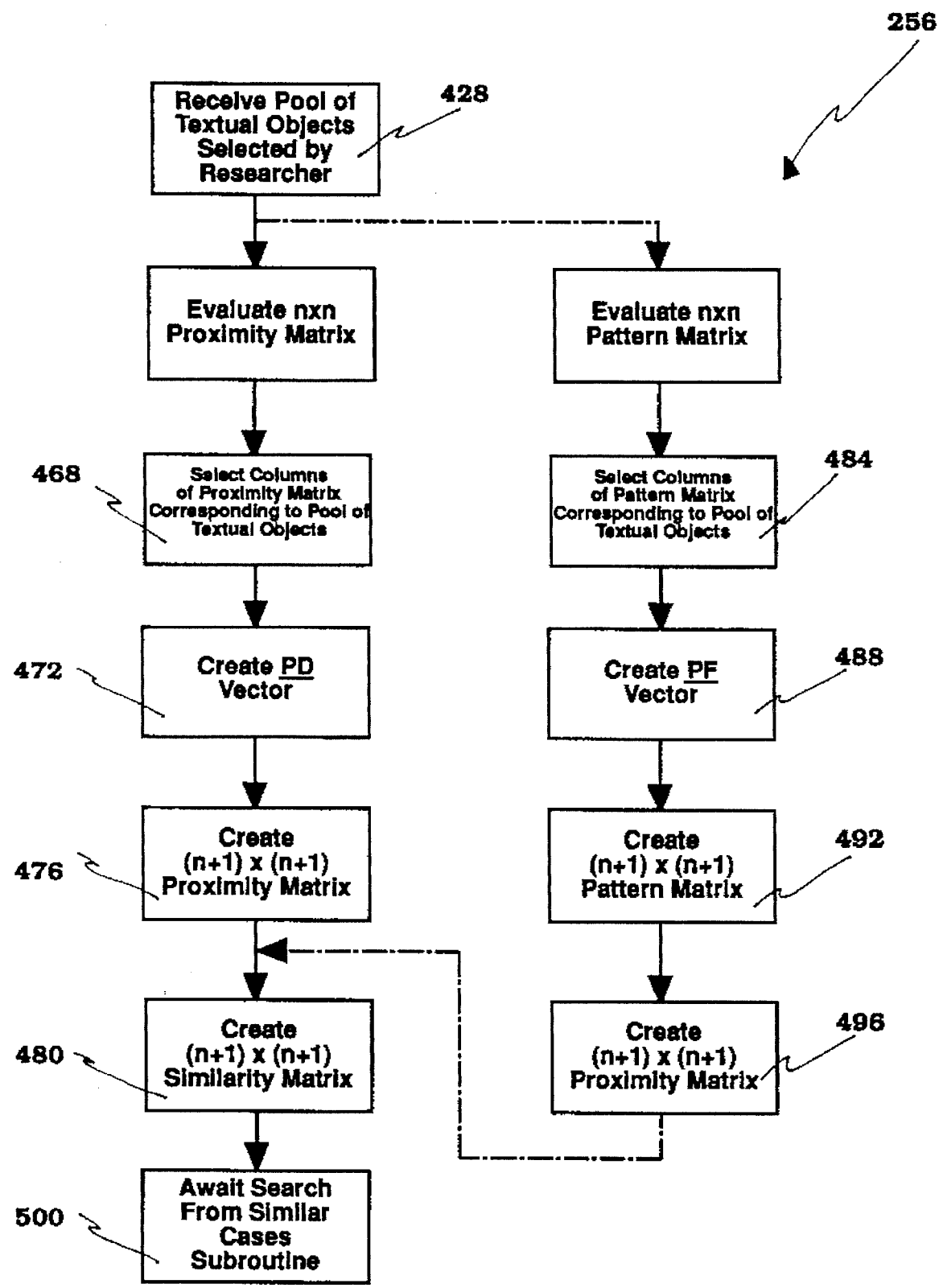

Section F Pool-Importance Subroutine 252:

FIG. 4H is a high level flow chart for the Pool-Importance Subroutine 252.

18. The researcher must select a pool of full textual objects.

19. The Pool-Importance Subroutine 252 examines 448 the n×n Opinion Citation Matrix, the n×n Opinion Similarity Matrix, numerical factors and other matrices and values created by the Proximity Indexing Application Program 62 for the pool of full textual objects 460.

20. The Pool-Importance Subroutine 252 then ranks the importance of each of the full textual objects in the pool 464.

FIG. 4I is a high level flow chart showing two possible alternate Pool-Paradigm-Similarity Subroutines 256.

Section G Pool-Paradigm-Similarity Subroutine 256 (Option 1) 256:

21. The researcher must select a pool of k full textual objects where k equals the number of full textual objects in the pool 428.

22. For each of the k full textual objects, the Pool-Paradigm-Similarity Subroutine 256 selects a n×1 vector from the corresponding column of the n×n matrix 468.

23. The Pool-Paradigm-Similarity Subroutine 256 creates an n×k matrix by grouping the n×1 vector representing each of the k full textual objects beside each other.

24. The Pool-Paradigm-Similarity Subroutine 256 calculates the mean of each row of the n×k matrix and enters the mean in the corresponding row of an n×1 Paradigm Proximity Vector 472.

25. The Pool-Paradigm-Similarity Subroutine 256 combines the n×1 Paradigm Proximity Vector with the n×n Opinion Proximity Matrix to create an (n+1)×(n+1) Paradigm Proximity Matrix 476.

26. From the (n+1)×(n+1) Paradigm Proximity Matrix, the Pool-Paradigm-Similarity Subroutine 256 evaluates the Euclidian distances and empirical data to create an (n+1)×(n+1) Paradigm Similarity Matrix 480.

27. The Pool-Paradigm Similarity Subroutine searches the row in the (n+1)×(n+1) Paradigm Similarity Matrix that corresponds to the Paradigm full textual object and retrieves the full textual objects that have a maximum degree of similarity with the Paradigm lull textual object 500.

Section H Pool-Paradigm-Similarity Subroutine 256 (Option 2):

28. The researcher must select a pool of k full textual objects where k equals the number of full textual objects in the pool 428.

29. For each of the k full textual objects, the Pool-Paradigm-Similarity Subroutine 256 selects an n×1 vector from the corresponding column of the n×n matrix 484.

30. The Pool-Paradigm-Similarity Subroutine 256 creates an n×k matrix by grouping the n×1 vector for each of the k full textual objects beside each other.

31. The Pool-Paradigm-Similarity Subroutine 256 calculates the mean of each row of the n×k matrix and enters the mean in the corresponding row of an n×1 Paradigm Pattern Vector PF 488.

32. The Pool-Paradigm-Similarity Subroutine 256 combines the n×1 Paradigm Pattern Vector PF with the n×n Opinion Pattern Matrix to create a (n+1)×(n+1) Paradigm Pattern Matrix 492.

33. From the (n+1)×(n+1) Paradigm Pattern Matrix, the Pool-Paradigm-Similarity Subroutine 256 evaluates the Euclidean distances between the rows of the Paradigm Pattern Matrix and creates an (n+1)×(n+1) Paradigm Proximity Matrix 496.

34. From the (n+1)×(n+1) Proximity Matrix, the Pool-Paradigm-Similarity Subroutine 256 evaluates the Euclidean distances between the rows of the (n×1)×(n×1) Paradigm Proximity Matrix and empirical data to create an (n+1)×(n+1) Paradigm Similarity Matrix 480.

35. The Pool-Paradigm Similarity Subroutine searches the row in the (n+1)×(n+1) Paradigm Similarity Matrix that corresponds to the Paradigm full textual object and retrieves the full textual objects that have a minimum degree of similarity with the Paradigm full textual object 500.

Application of the Proximity Indexing Technique.

The above Proximity Indexing Application Program 62 and CSPDM 66 have a number of different applications and versions. Three of the most useful applications are described below.

The first type of Proximity Indexing Application Program is for use on very large databases. The matrices generated by this type of Proximity Indexer are "attached" to the database 54, along with certain clustering information, so that the database 54 can be searched and accessed using the Cases-In Subroutine 232, Cases-After Subroutine 236, Cases-Similarity Subroutine, Pool-Similarity Subroutine 244, Pool-Paradigm Subroutine 248, Pool-Importance Subroutine 252 and Pool-Paradigm-Similarity Subroutine 256 of the CSPDM 66.

The second type of Proximity Indexing Application Program 62 is a Proximity Indexer that law firms, businesses, government agencies, etc. can use to Proximity Index their own documents in their own databases. The researcher can navigate through the small business's preexisting database 54 using the Cases-In Subroutine 232, Cases-After Subroutine 236, Cases-Similarity Subroutine, Pool-Similarity Subroutine 244, Pool-Paradigm Subroutine 248, Pool-Importance Subroutine 252 and Pool-Paradigm-Similarity Subroutine 256 of the CSPDM 66. In addition, this type of Proximity Indexer Application Program will be designed to be compatible with the commercial third-party databases which are Proximity Indexed using the first type of program. In other words, the researcher in a small business may "weave" in-house documents into a commercial database 54 provided by a third party, so that searches in the large database 54 will automatically bring up any relevant in-house documents, and vice versa.

The third type of Proximity Indexing Applications Program involves the capacity to do Proximity indexing of shapes. Each image or diagram will be treated as a "textual object." The various matrix coefficients can be generated purely from topological analysis of the object itself, or from accompanying textual information about the object, or from a weighted combination of the two. The text is analyzed using the Proximity Indexing Application Program 62 as explained above. Shapes are analyzed according to a coordinate mapping procedure similar to that used in Optical Character Recognition ("OCR"). The numerical "maps" resulting from scanning the images are treated as "textual objects" that can be compared through an analogous weighing algorithm to generate a proximity matrix for every ordered pair of "textual objects" in the database 54. A similarity matrix can then be generated for each ordered pair, and the results organized analogous to a database 54 totally comprised of actual text.

This third type of Proximity indexing applications program can provide "Proximity Indexed" organization access to many different types of objects. For example, it can be used to search patent diagrams, or compare line drawings of known pottery to a newly discovered archeological find. It can be used to scan through and compare police composite drawings, while simultaneously scanning for similar partial descriptions of suspects. It can be used to locate diagrams of molecular structures, appraise furniture by comparing a new item to a database 54 of past sales, identify biological specimens, etc., etc.

Figure 5A:
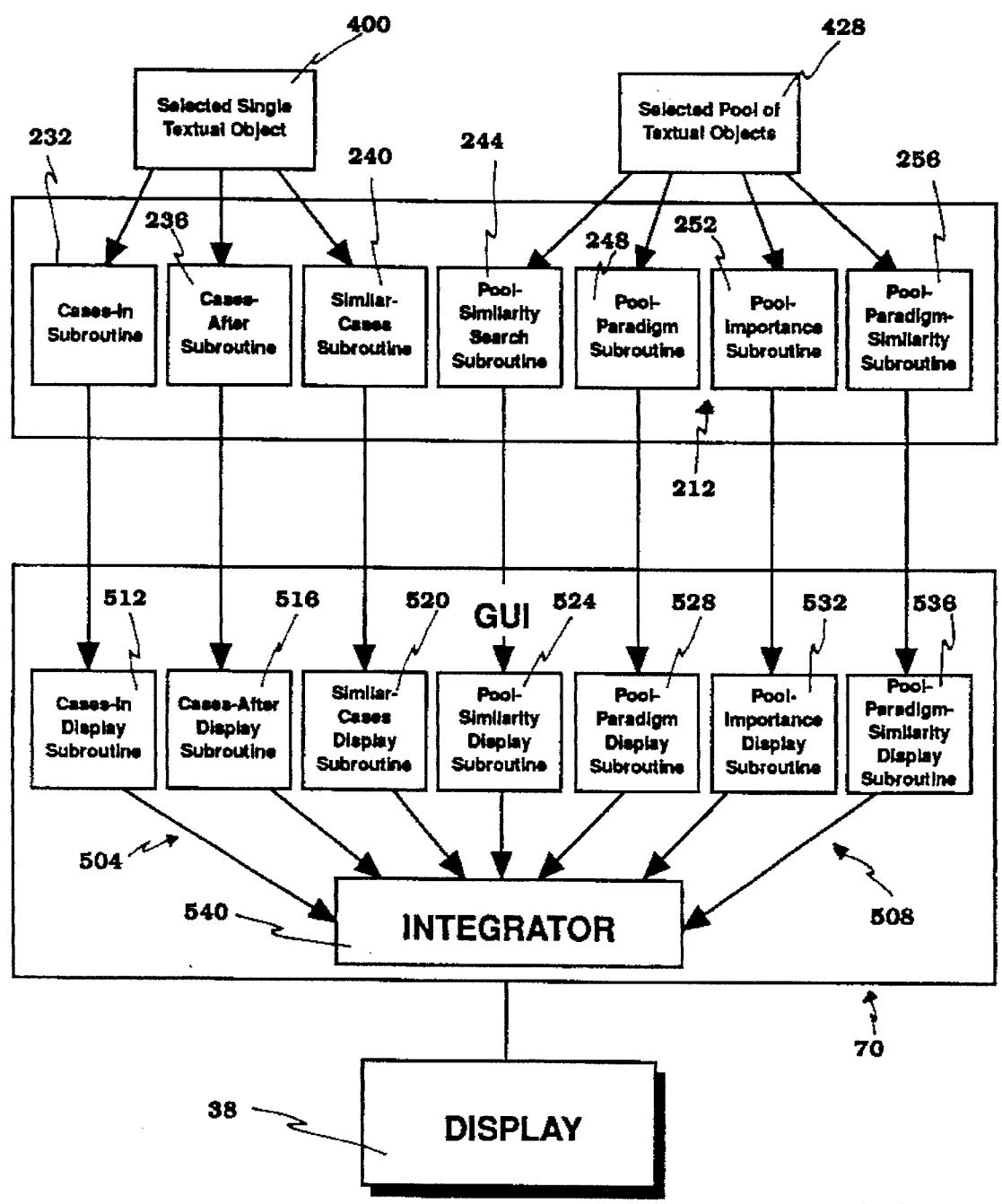
FIG. 5A is a high level diagram illustrating the interaction between respective subroutines of the CSPDM and of the GUI Program. The diagram further illustrates the interaction between the GUI Program and the display.

FIG. 5A is a high level drawing that depicts the GUI Program 70 and its interaction with both the CSPDM 66 and the display 38. The GUI Program 70 has one or more display subroutines. The preferred embodiment contains seven display subroutines. The seven subroutines comprise three textual object display subroutines 504 and four pool display subroutines 508. The three textual object display subroutines 504 are the Cases-In Display Subroutine (CIDS) 512, the Cases-After Display Subroutine (CADS) 516 and the Similar-Cases Display Subroutine (SCDS) 520. The four pool display subroutines 508 are the Pool-Similarity Display Subroutine (PSDS) 524, the Pool-Paradigm Display Subroutine (PPDS) 528, the Pool-Importance Display Subroutine (PIDS) 532 and the Pool-Paradigm-Similarity Display Subroutine (PPSDS) 536. The three textual object display subroutines receive data from the corresponding textual object search subroutine of the CSPDM 66. Similarly, the four pool display subroutines 508 receive data from the corresponding pool search subroutine 212 of the CSPDM 66. Once the display subroutines have processed the data received by the search subroutines, the data is sent to the integrator 540. The integrator 540 prepares the data to be displayed in the proper format on the display 38.

FIGS. 5B through 5H depict screens generated by the textual object display subroutines, CIDS 512, CADS 516 and SCDS 520. The three types of screens are the Cases In screen 1000, the Cases After screen 1004 and the Similarity Screen 1008, respectively. The Similarity Screen 1008 provides the most "intelligent" information, but all three screens generated by the textual object display subroutines work in tandem as a system. The other screens created by the pool display subroutines are variances of these three, and also work in tandem with each other and with the three textual object display screens.

Figure 5B:
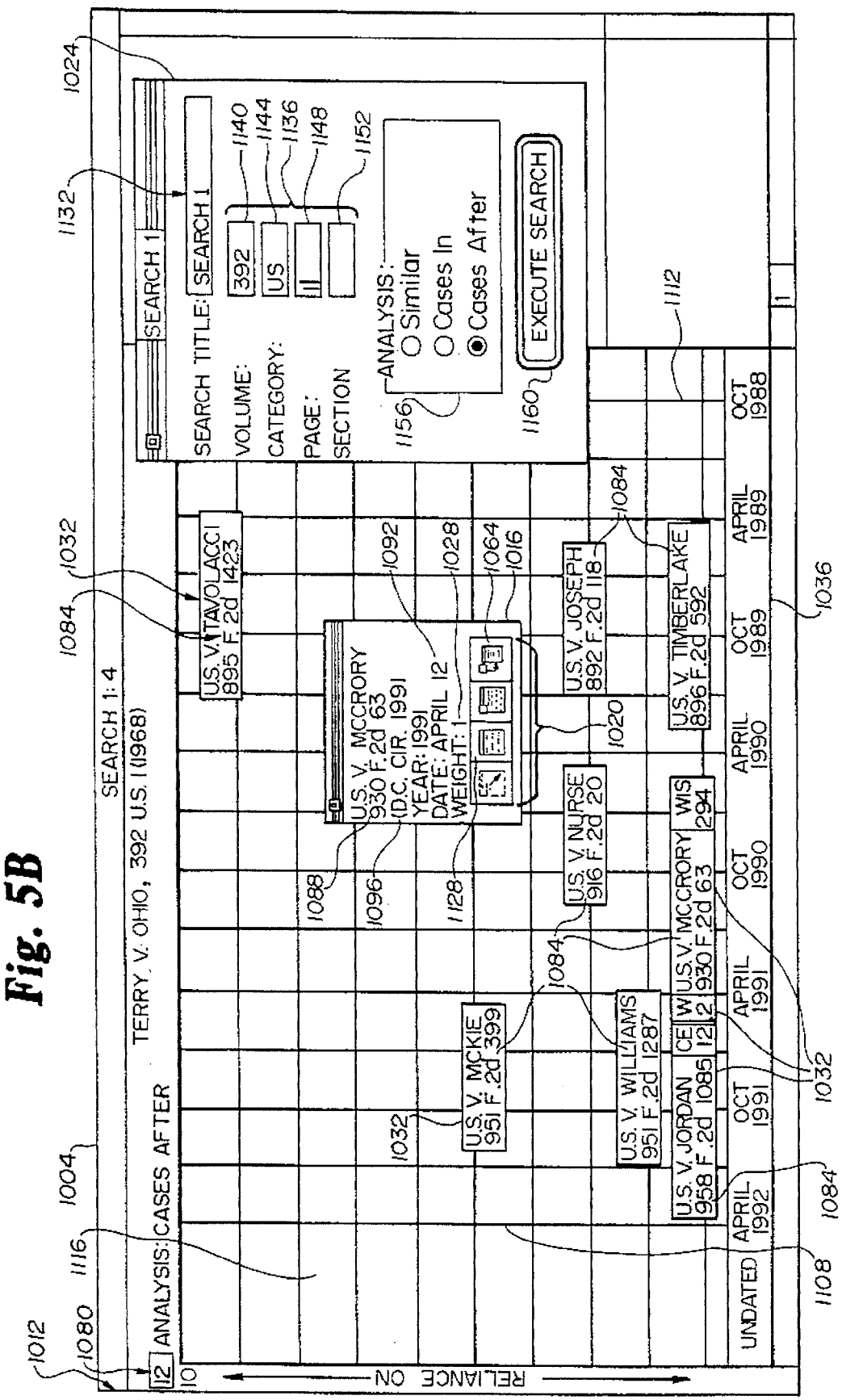
FIG. 5B is an example of the display once the Cases-After Display Subroutine (CADS) is executed.

FIG. 5B depicts the "Cases After" 1004 Screen created by the CADS 516 for the textual object, *Terry v. Ohio,* 392 U.S. 1 (1968). The "Cases After" search produces all of the textual objects in the designated field (here D.C. Circuit criminal cases since 1990) that cite Terry. The number "12" in the upper left hand corner indicates that there are a total of 12 such textual objects. The vertical axis 1012 indicates the degree to which a given textual object relied upon Terry. The number "10" immediately below the 12 indicates that the textual object in the field which most relied upon Terry, namely *U.S. v. Tavolacci,* 895 F.2d 1423 (D.C. Cir. 1990), discusses or refers to Terry in ten of its paragraphs.

The Tear-Off Window 1016 feature is illustrated in FIG. 5B by the Tear-Off Window 1016 for *U.S. V. McCrory,* 930 F.2d 63 (D.C. Cir. 1991). The four Tear-Off Window active boxes 1020 (displayed on the Tear-Off Window 1016): 1) open up the full text 1104 of McCrory to the first paragraph that cites Terry; 2) run any of the three searches, namely Cases-In Subroutine 232 Cases-After Subroutine 236 or Cases-Similar Subroutine 240 for McCrory itself (the default is to run the same type of search, namely Cases-After Subroutine 236 again); 3) hide the Terry execute search window 1024; and 4) bring the Terry Execute Search window 1024 to the foreground, respectively. The weight numeral 1028 indicates the number of paragraphs in McCrory that discusses or refers to Terry, in this textual object (in this example there is only one).

The "Cases After" screen 1004 for a given Textual object B displays a Textual Object Active Box 1032 representing every subsequent textual object in the database 54 that refers explicitly to Textual object B. The analysis starts with the same pool of material as a Shepards™ list for Textual object B. As well as some additional material not gathered by Shepards. However, the "Cases After" screen 1004 conveys a wealth of information not conveyed by a Shepards™ list.

The horizontal axis 1036 may represent time, importance or any other means of measurement to rank the textual objects. In the preferred embodiment, the horizontal axis 1036 represents time. The Shepards list itself contains no information as to when a case was decided. The vertical axis 1012 similarly may represent any means of measurement to rank the textual objects. In the preferred embodiment, the vertical axis 1012 represents the degree to which the subsequent Textual object C relied upon the original Textual object B. The display 38 makes it obvious when a textual object has received extensive discussion in another textual object, or provides key precedent for a subsequent textual object, or merely mentions the earlier textual object in passing. It also provides guidance as to possible gradations in between extensive, or merely citing.

The "shape" of the overall pattern of active boxes on the "Cases After" screen 1004 provides a rich lode of information to be investigated. For example, a "dip" in citation frequency immediately after a particular textual object suggests that the particular textual object, while not formally overruling Textual object B, has largely superseded it. A sudden surge in citation frequency after a particular Supreme Court case may indicate that the Supreme Court has "picked up" and adopted the doctrine first enunciated in Textual object B. The researcher can instantly determine if the holding of Textual object B has been adopted in some circuits but not in others, if Textual object B is losing strength as a source of controlling precedent, etc. None of this information is now available to lawyers in graphical or any other form.

As with the "Cases In" screen 1000, every Textual Object Active Box 1032 on the "Cases After" screen is active, and includes a Tear-Off Window 1016 that may be moved by dragging on the tear-off window 1016 with a mouse 42, and that tear-off window 1016 becomes a text Tear-Off Window 1040, visible even when one moves on to other searches and other screens. Thus one may "tear off" for later examination every relevant citation to Textual object B, or even for a group of textual objects. The text tear-off windows "tile"; that is, they can be stacked on top of one another to take up less room. There is also a "Select All" feature (not shown), that creates a file containing the citations of every textual object retrieved in a given search.

In "Cases After" mode, clicking on the expanded-view button 1044 of the text tear-off window 1040 opens the text of the subsequent Textual object C to the first place where Textual object B is cited. A paragraph window 1048 displays a paragraph selection box 1052 indicating what paragraph in Textual object C the researcher is reading, and a total paragraph box 1056 indication how many paragraphs Textual object C contains in total. The user can view paragraphs sequentially simply by scrolling through them, or see any paragraph immediately by typing its number in the paragraph selection box 1052. Clicking on a Next paragraph active box 1060 immediately takes the researcher to the next paragraph in Textual object C where Textual object B is mentioned. Traditional Shepardizing allows the researcher to explore the subsequent application of a doctrine in a range of different factual situations, situations that help to define the outer contours of the applicability of a rule. Combining the expanded-view button functions 1044 and "Next Paragraph" active box 1060 functions allows the researcher to study how Textual object B has been used in all subsequent textual objects, in a fraction of the time the same task currently requires with available searching methods.

Perhaps the most fundamental form of legal research is "Shepardizing." A researcher starts with a textual object known to be relevant, "Textual object B," and locates the "Shepards" for that textual object. The "Shepards" is a list of every subsequent textual object that explicitly refers to Textual object B. The researcher then looks at every single textual object on the list. Shepardizing is often painstaking work. Many subsequent references are made in passing and have almost no legal significance. Although Shepards includes some codes next to its long lists of citations, such as "f" for "followed" and "o" for "overruled," the experience of most lawyers is that such letters cannot be relied upon. For example, the researcher may be citing Textual object B for a different holding than that recognized by the anonymous Shepards reader, interpreting Textual object B differently, or interpreting the subsequent textual object differently. However, for really thorough research, checking a Shepards type of list is essential. The researcher must make absolutely sure that any textual object cited as legal authority in a brief, for instance, has not been superseded by later changes in the law.

Very often, textual objects located on the Shepards list for Textual object B refer back to other important textual objects, some of which may predate Textual object B, all of which may be Shepardized in turn. This "zig-zag" method of research is widely recognized as the only way to be sure that one has considered the full line of textual objects developing and interpreting a doctrine. The real power of the "Cases After" screen 1004 emerges when it is used in conjunction with the "Cases In" screens 1000 and "Similarity" screens 1008. Using the preferred embodiment, the researcher may engage in the same kind of careful "zig-zag" study of a legal doctrine in a much more efficient manner.

For example, consider the following hypothetical search. The researcher reads Textual object B, and makes a list of every Supreme Court textual object it substantially relies upon, perhaps six textual objects. The researcher then Shepardizes Textual object B and reads each of those textual objects, in order to find other Supreme Court textual objects that they relied upon, perhaps eight. One then Shepardizes those fourteen Supreme Court decisions, in order to find any Court of Appeals cases in a selected circuit 1096 within the last three years on the same basic topic. This process would take at least an hour, even using Shepards through an on-line service. The same search can be performed with the present invention using the "Cases In" screens 1000 and "Cases After" screens 1004 in under five minutes.

In order to perform the same search, a researcher can pull up both the "Cases In" screens 1000 and "Cases After" screens 1004 for Textual object B simultaneously. The researcher can then "tear-off" all of the Supreme Court Cases on both lists, run Cases-After Subroutine 236 searches on every Supreme Court Case mentioned on either list, then examine the "Cases In" screens 1000 for all of the Supreme Court cases produced by these searches. The researcher can locate every recent Court of Appeals case from one's circuit 1096 mentioned in any of those Supreme Court cases. Use of the "Similarity" screen 1008 as well, allows the researcher to find the pool of relevant Court of Appeals full textual objects even faster.

Figure 5C:
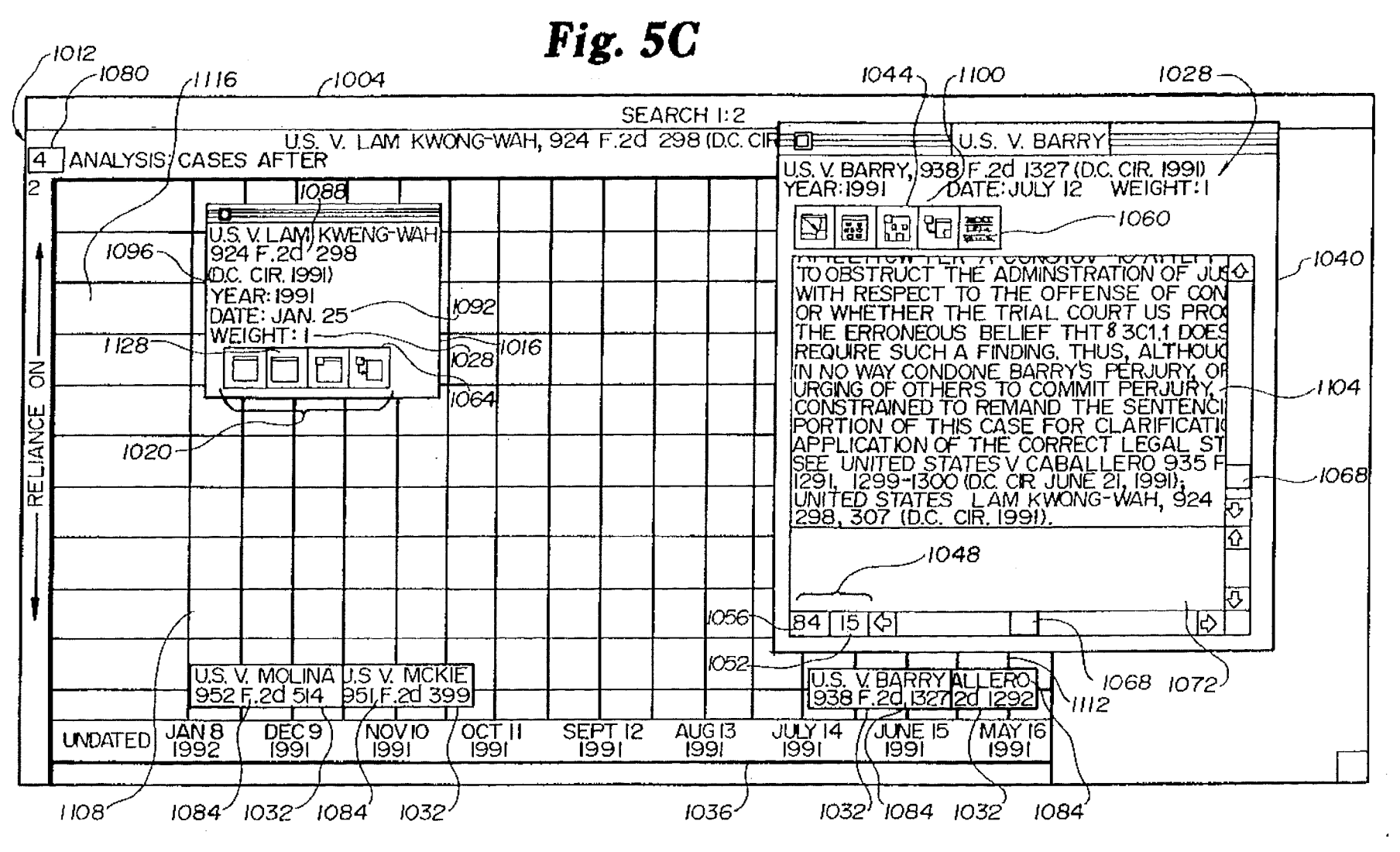

FIG. 5C depicts the "Cases After" Screen 1004 for *U.S. v. Lam Kwong-Wah*, 924 F.2d 298 (D.C. Cir. 1991). FIG. 5C shows a text Tear-Off Window 1040 on a "Cases After" Screen 1004, (in this textual object the Tear-Off Window 1016 for *U.S. v. Barry*, 938 F.2d 1327 (D.C. Cir. 1991), is opened using the full text active box 1064. A text Tear-Off Window 1040 containing the text of Barry opens, to the first cite of *U.S. v. Lam Kwong-Wah* at paragraph 15. Clicking on the "Next Paragraph" active box 1060 will open the text of Barry to the next paragraph that cites *Lam Kwong-Wah*.

The number "34" in the lower-left corner of the total paragraph box 1056 indicates that Barry has a total of 34 paragraphs in the cite *U.S. v. Lam Kwong-Wah*. Dragging the small squares 1068 to the left and below the text allow the researcher to move within a paragraph, and from paragraph to paragraph, in the text of Barry, respectively. The empty space below the text 1072 would contain the text of any footnote in paragraph 15. The compress window active box now closes the window and replaces it with the corresponding active box.

Figure 5D:
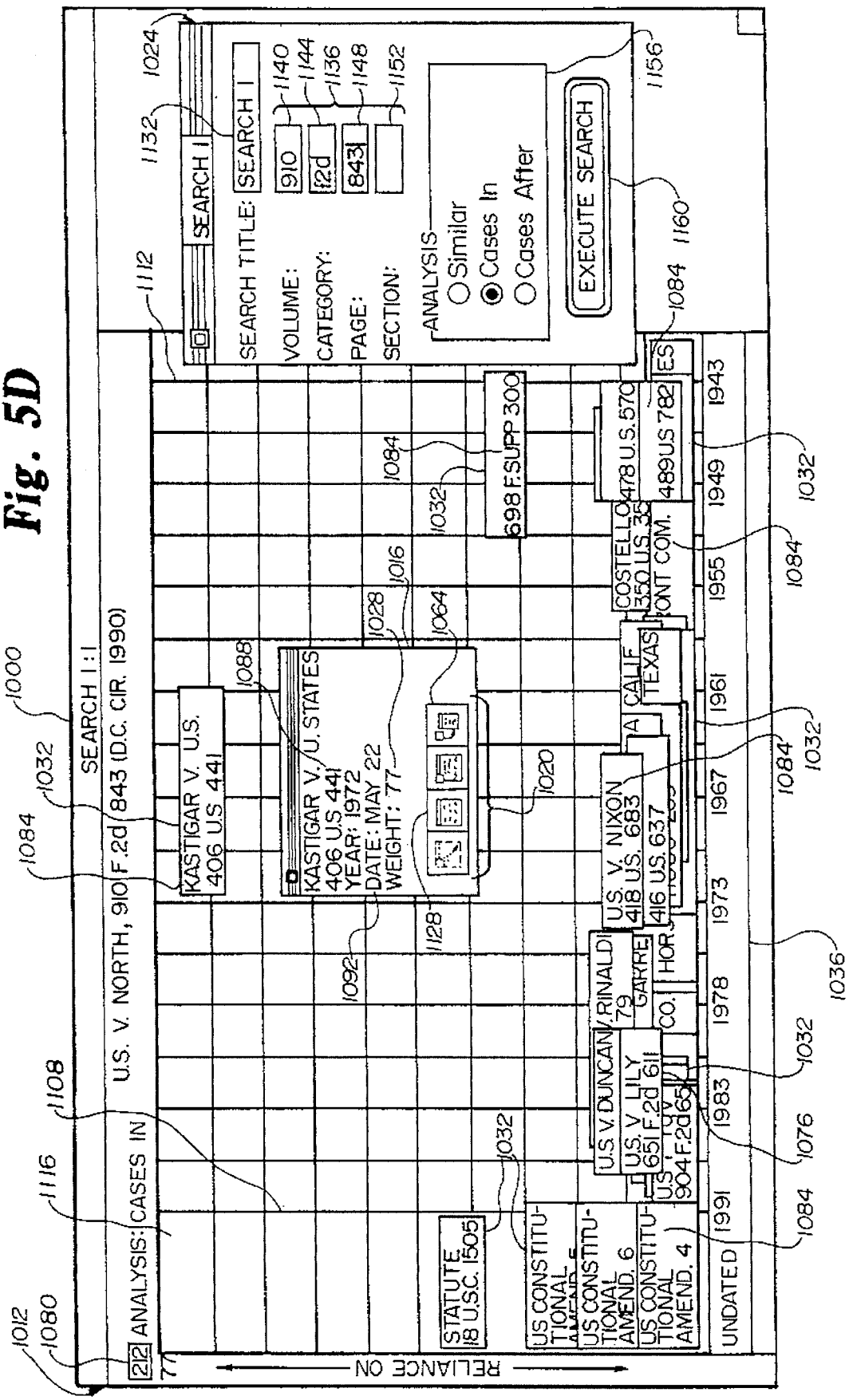
FIG. 5D is an example of the display once the Cases-In Display Subroutine (CIDS) is executed.

FIG. 5D depicts the "Cases In" Screen 1000 for *U.S. v. North*, 910 F.2d 843 (D.C. Cir. 1990). FIG. 5D contains a Textual Object Active Box 1032 representing every textual object with persuasive authority, cited in the text of North. The vertical axis 1012 represents the degree to which North relied upon a given textual object. In this example it is immediately apparent that *Kastigar v. United States*, 406 U.S. 441 (1972) is the most important precedent, and its Tear-Off Window 1016 has been activated. The weight numeral 1028 indicates that Kastigar is referred to in seventy-seven (77) paragraphs of North.

A highlighted Textual Object Active Box 1076 can be created by clicking on it, as has been done with *U.S. v. Mariana*, 851 F.2d 595 (D.C. Cir. 1988). The number "212" in the case number box 1080 indicates that citations to two-hundred-twelve distinct texts appear in North. Fewer are visible because the textual object active boxes 1032 "tile" on top of one another; the "Zoom" feature is used to focus on a smaller area of the screen, and ultimately resolves down to a day-by-day level, making all the textual object active boxes 1032 visible.

The unique "Cases In" screen 1000 provides a schematic representation of the precedent from which Textual object A is built. The "Cases In" screen 1000 contains a textual object "active box" 1032 representing every textual object which is relied upon, or even mentioned, in Textual object A. Any citation in textual object A to a textual object that possesses potential persuasive authority, whether a statute, constitutional provision, treatise, scholarly article, Rule of Procedure, etc., is treated as a "textual object." The textual object active boxes 1032 are color-coded to indicate the court or other source of each textual object. Supreme Court cases are red, Court of Appeals cases are green, District Court cases are blue, and statutes are purple, for example. Each Textual Object Active Box 1032 contains the full official citation 1084 of its textual object. Clicking on any Textual Object Active Box 1032 immediately pulls up a larger window, known as a "tear-off" window, also containing the full citation 1084 to the textual object (Tear-Off Window Citation 1088), its date 1092, its circuit 1096, and its weight numeral 1028 to the textual object being analyzed. The user may then drag the Tear-Off Window 1016 free of the Textual Object Active Box 1032 and release it.

This creates a text Tear-Off Window 1040 that remains visible until the researcher chooses to close it, no matter how many subsequent screens the researcher examines. The text Tear-Off Window 1040 can be moved anywhere by dragging it with the mouse 42. The text Tear-Off Window 1040 contains small text active boxes 1100 allowing the researcher to access or "pull up" the full text 1104 of the textual object it represents with a single click of the mouse 42. This feature also allows the researcher to run Cases-In Subroutine 232 Cases-After Subroutine 236 and Cases-Similar Subroutine 240 searches on the textual object. (See below for a description of the "Similarity" screen).

The organization of the boxes on the screen, including their position on the horizontal axis 1036 and vertical axis 1012, represents the real "intelligence" behind the Cases-In screen 1000. The horizontal axis 1036 in the preferred embodiment represents time, with the left margin 1108 corresponding to the present, i.e., the date 1092 when the search is run. The right margin 1112 represents the date 1092 of decision of the earliest textual object cited in Textual object A. (Certain special materials, such as treatises updated annually, and the U.S. Constitution, are located in a column 1116 to the left of the margin.)

The vertical axis 1012 in the preferred embodiment represents the degree to which Textual object A relied upon each particular textual object it contains. For example, if the Cases In screen 1000 is run on a district court case (Textual object A) which happens to be a "stop and search" textual object that mainly relies upon *Terry v. Ohio*, 392 U.S. 1 (1968), Terry will be at the top of the screen, with all other textual object active box 1032 appearing far below. The researcher can thus access the text of Terry directly without ever reading the text of Textual object A. Of course, the full text 1104 of Textual object A is also instantly available if desired. If the researcher wants to see where Terry "came from," the researchers can instantly, by clicking on a textual active box 1100 within the Terry text Tear-Off Window 1040, run the Cases-In Subroutine 232 for Terry—and so on. There is no limit to the number of "levels" or "generations" the researchers may explore using this technique. It is therefore possible (assuming a sufficient database 54) to find, in a matter of seconds, without having to read through layers of texts, the possibly long-forgotten eighteenth-century precursors to a modern doctrine.

The "Cases In" screen 1000 creates an instant visual summary or "blueprint" of a textual object. The blueprint can help a researcher make a preliminary judgment about whether a particular textual object is worth closer examination. Viewing the "Cases In" screens 1000 for a group of textual objects allows a researcher to recognize whether there are precedents common to that group. The blueprint tells the researcher whether Textual object A is primarily a statutory construction case, a textual object that relies on local Court of Appeals cases without Supreme Court support, a textual object relying on precedent outside the circuit 1096 as persuasive authority, etc.

The initial "Cases In" screen 1000 presents every citation within a given textual object. In a textual object with an unusually large number of citations, the screen will be crowded with textual object active boxes 1032. The GUI therefore contains a "zoom" feature that allows the researcher to expand any small portion of the screen. To get back to the "big picture," the researcher simply selects the "Fit in Window" menu item, or else selects the "zoom out" feature. The same "zoom," "zoom out," and "Fit in Window" functions are present in the "Cases After" screen 1004 and "Similarity" screen 1008 as well.

The routine that calculates "degree to which Textual object A relies upon the cited textual object" clearly ranks major textual objects at the top, textual objects mentioned only in passing at the bottom, and textual objects of potentially greater relevance in between. In addition, the routine can recognize when a highly relevant textual object is mentioned only in passing and give a higher weight to that textual object than it would otherwise receive in the ranking procedure.

The "intelligence" behind the entire GUI is driven by the knowledge that the lawyers do not want the computer to do legal analysis or make judgments for them, but simply guide them through the great mass of irrelevant material to those texts where lawyerly analysis of a problem begins.

The "Cases In" screen 10004 is designed with practical legal research in mind. It is common in legal research to locate a lower court textual object on the correct topic, call it "local Textual object A." However, the researcher desired to find the most persuasive authority available. The aim of this type of research is to find the "lead" textual object or textual objects on a particular topic. The researcher ultimately desires the first textual object, most famous textual object, and most recent textual objects of the Supreme Court (or state Supreme Court in state law issues) that stand for the same principle. ("Lead" textual objects also occur at the intermediate and trial court level.)

The standard way to find lead textual objects is to read through the text of a local Textual object A until one finds references to "higher court textual objects," then look up each of those higher court textual objects in turn. The researcher then reads the text of those textual objects until the researcher determines the textual objects they have in common, the textual objects that appear many times. Very often, the lower court textual object from which the researcher started is of no real value in and of itself—it may well be from a different local jurisdiction—and the researcher reads through it only to find citations within it. Since the GUI quickly locates and schematically diagrams the textual objects, this process is accelerated dramatically using the GUI.

Figure 5E:
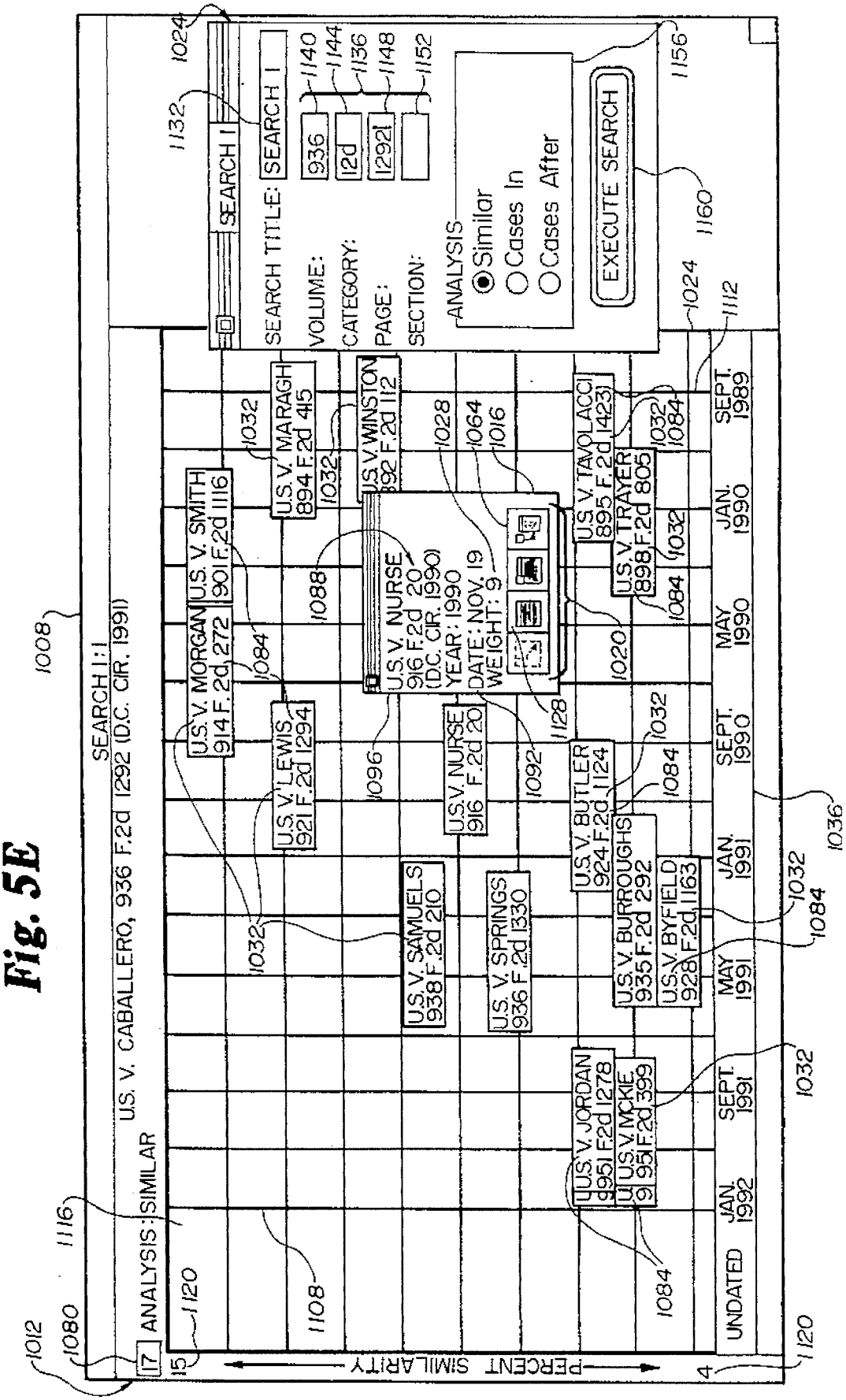
FIG. 5E is an example of the display once the Similar-Cases Display Subroutine (SCDS) is executed.
Figure 5F:
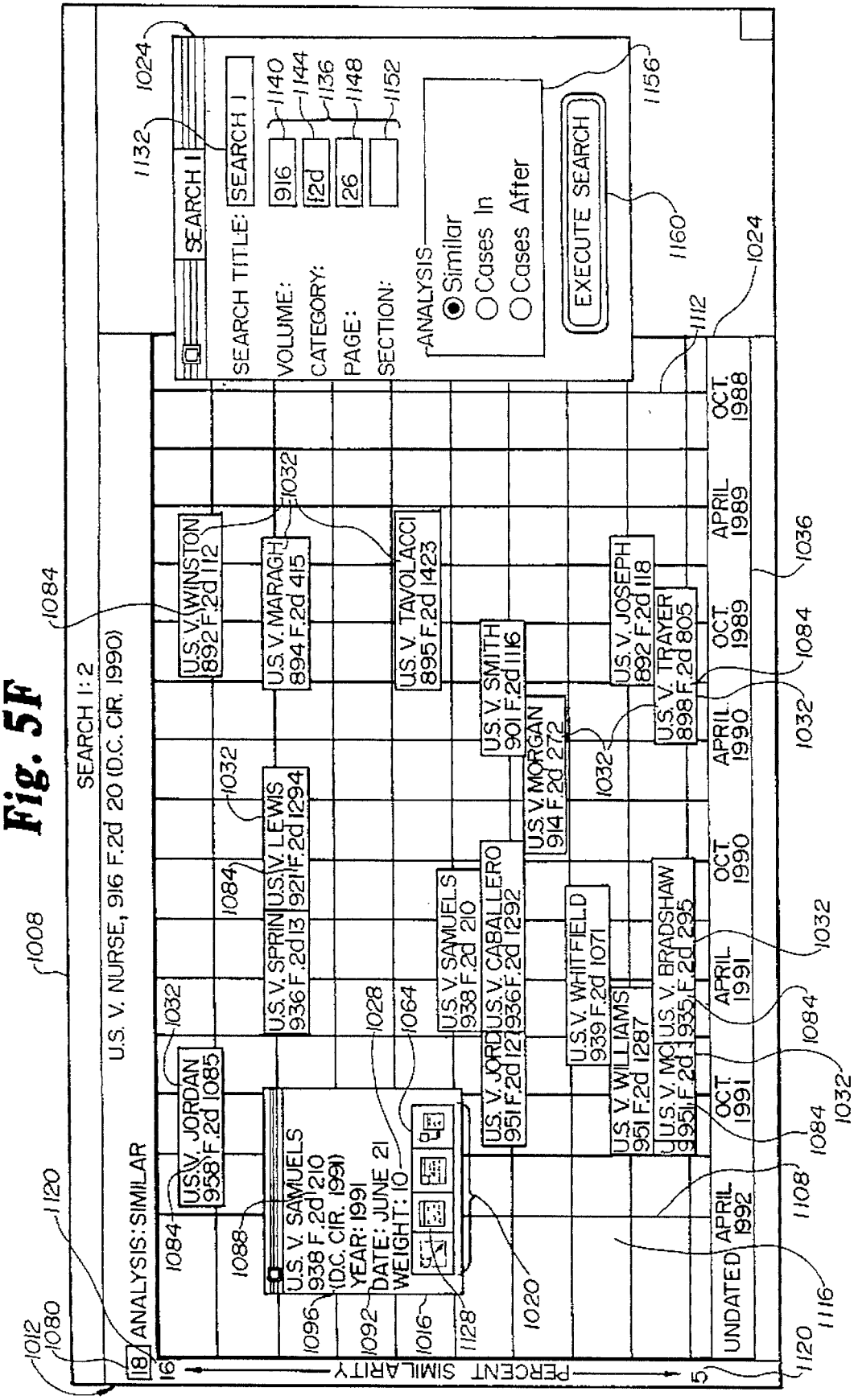
FIG. 5F is an example of the display after a user chooses to execute the Similar Cases Subroutine for a textual object retrieved by the Similar-Cases Subroutine represented in FIG. 5E.
Figure 5G:
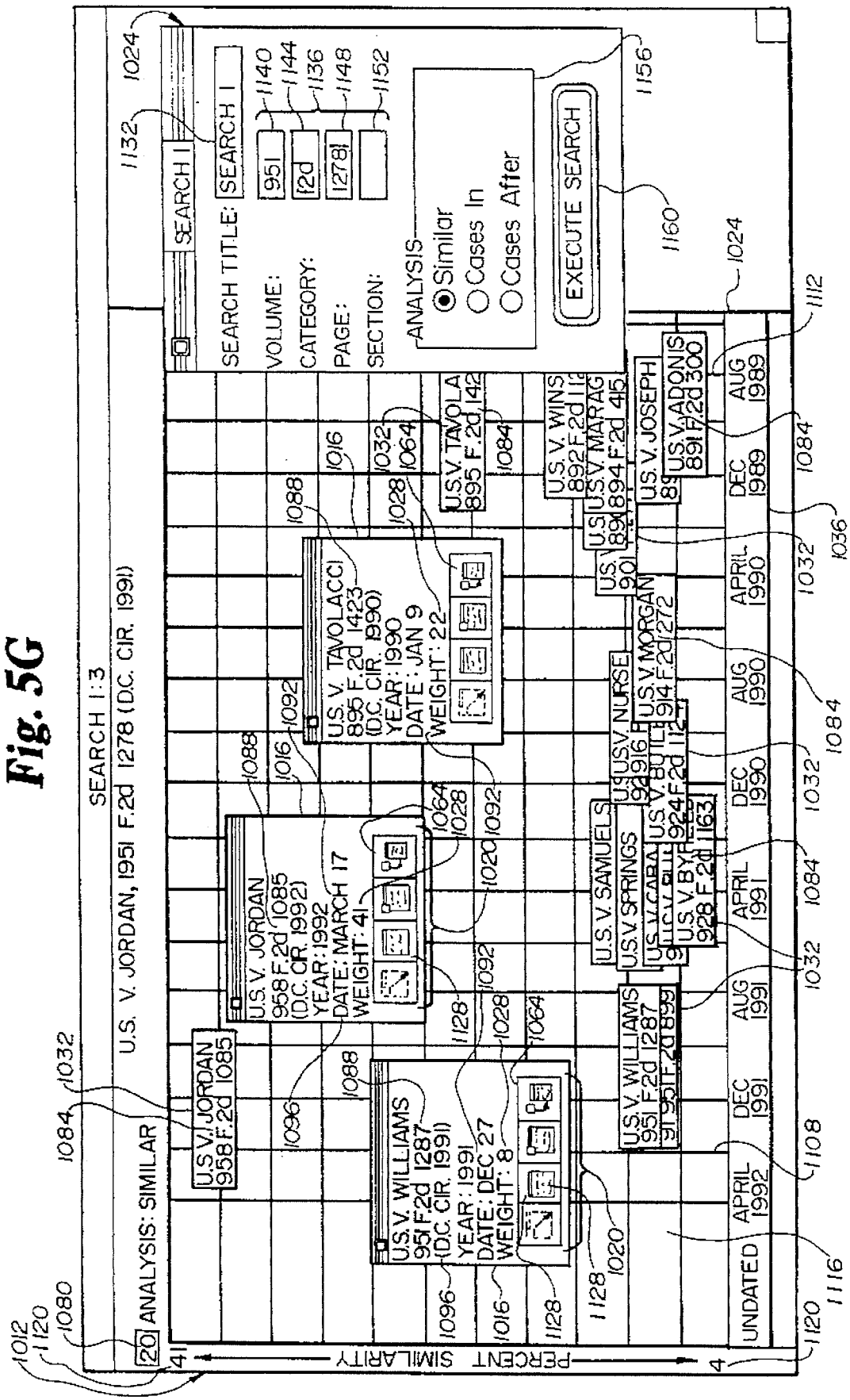
FIG. 5G is an example of the display after a user chooses to execute the Similar Cases Subroutine for one of the cases retrieved by the Similar-Cases Subroutine represented in FIG. 5F.

FIGS. 5E through 5G depict multiple "Similarity" searches run in sequence. A "Similarity" Screen for *U.S. v. Caballero*, 936 F.2d 1292 (D.C. Cir. 1991), reveals via the case number box 1080, that 17 textual objects were retrieved by a "similarity" search. The vertical axis 1012 indicates that the textual objects retrieved had similarity coefficients 1120 between 4% and 15% with respect to *U.S. v. Caballero*. Cases with less than 4% similarity are not shown. The vertical axis 1012 represents degree of similarity, or topical relatedness, so that 100% would be two identical texts. The Tear-Off Window 1016 of *U.S. v. Nurse*, 916 F.2d 20 (D.C. Cir. 1990) shows that the textual object has a similarity of 9%.

The "Similarity" screen for a given Textual object C is organized like the "Cases In" and "Cases After" screens, with the same color-coded textual object active boxes representing textual objects, and time on the horizontal axis 1036. However, the vertical axis 1012 represents the degree to which the represented textual object is related to Textual object C. The system is built on the principle that legal doctrines tend to emerge out of lines of textual objects developing a legal principle. Lines of textual objects contain "lead" textual objects that establish basic rules and subsequent textual objects that do not establish new rules, but apply and re-interpret the pre-existing rules in various circumstances. Some lead textual objects invent new doctrines, while others modify or redirect the law based on earlier precedent.

The routine that operates behind the "Similarity" screen determines which line or lines of textual objects that Textual object C can be grouped. The routine then ranks the textual objects in that line depending on how closely they are related to Textual object C. For example, a typical similarity search starting with a Court of Appeals case in a certain circuit, Textual object D, will find the Supreme Court and Court of Appeals cases that have established the principles followed in Textual object D. The Supreme Court and Court of Appeals case will appear as textual object active boxes whether or not they are cited in Textual object D. Furthermore, the similarity search will find the textual objects decided subsequent to Textual object D that have applied, and possibly modified, those principles, whether or not those textual objects cite Textual object D.

Similarity searches allow a researcher to find textual objects on the same topic that do not share common phrases and might be overlooked by a Boolean word search. Similarity searches also allow researchers, who only have an obscure district court case, to "tap in" to the lead textual objects in any area. By organizing all case law in "conceptual space," the Similarity screens allow one to locate emerging topics that have not been formally recognized by those assigning "key numbers" or otherwise manually classifying textual objects—or even by the authors of the textual objects themselves.

The "shape" of a Similarity Screen 1008 may convey a great deal of information about a particular legal concept. For example, the screen conveys to the researcher whether a certain concept, which is essentially novel, is supported by Supreme Court case law or is an old doctrine that has been recently applied in a new context. The system as a whole gives lawyers the ability to assess what textual objects are "available" on their topic, and to zero in on the textual objects that are most useful. The researcher has the ability to track down every subsequent reference to any particular textual objects by utilizing multiple "Cases After" searches, identifying core precedents through "Cases In" searches, and by running new "Similarity" searches to obtain any textual objects that emerge in closely related topic areas. The "Similarity" algorithm is more "aggressive" then the others, since it contains built-in judgments as to what "relatedness" means. It also judges what is no longer sufficient to display on the screen. The bottom edge of the screen represents a minimum degree of similarity below which the connections are too tenuous to be worth pursuing. In the commercial product, this minimum level can be reset at the preference of the user.

FIG. 5F:

FIG. 5F is the "Similarity Screen 1008" for *U.S. v. Nurse.* Clicking on the "run search" Tear-Off Window active box 1020, which is on the Tear-Off Window 1016 for *Nurse* produces FIG. 5F. Clicking on the Textual Object Active Box 1032 for *U.S. v. Jordan,* 951 F.2d 1278 (D.C. Cir. 1991) long enough to pull up its Tear-Off Window 1016, and then clicking on Jordan's "run search" Tear-Off Window active box 1020 (not shown), produces the Similarity Screen 1008 shown in FIG. 5G.

FIG. 5G:

FIG. 5G shows how multiple tear-off windows can be shown at the same time, here the *U.S. v. Jordan* similarity Tear-Off Window 1016 depicts for the three textual objects most similar to Jordan. Note that *U.S. v. Jordan,* 958 F.2d 1085 (D.C. Cir. 1992), is very closely related, i.e., 41%, to *U.S. v. Jordan,* 951 F.2d 1278 (D.C. Cir. 1991), apparently as it is a subsequent full textual object decision of the same dispute as the first textual object.

Figure 5H:
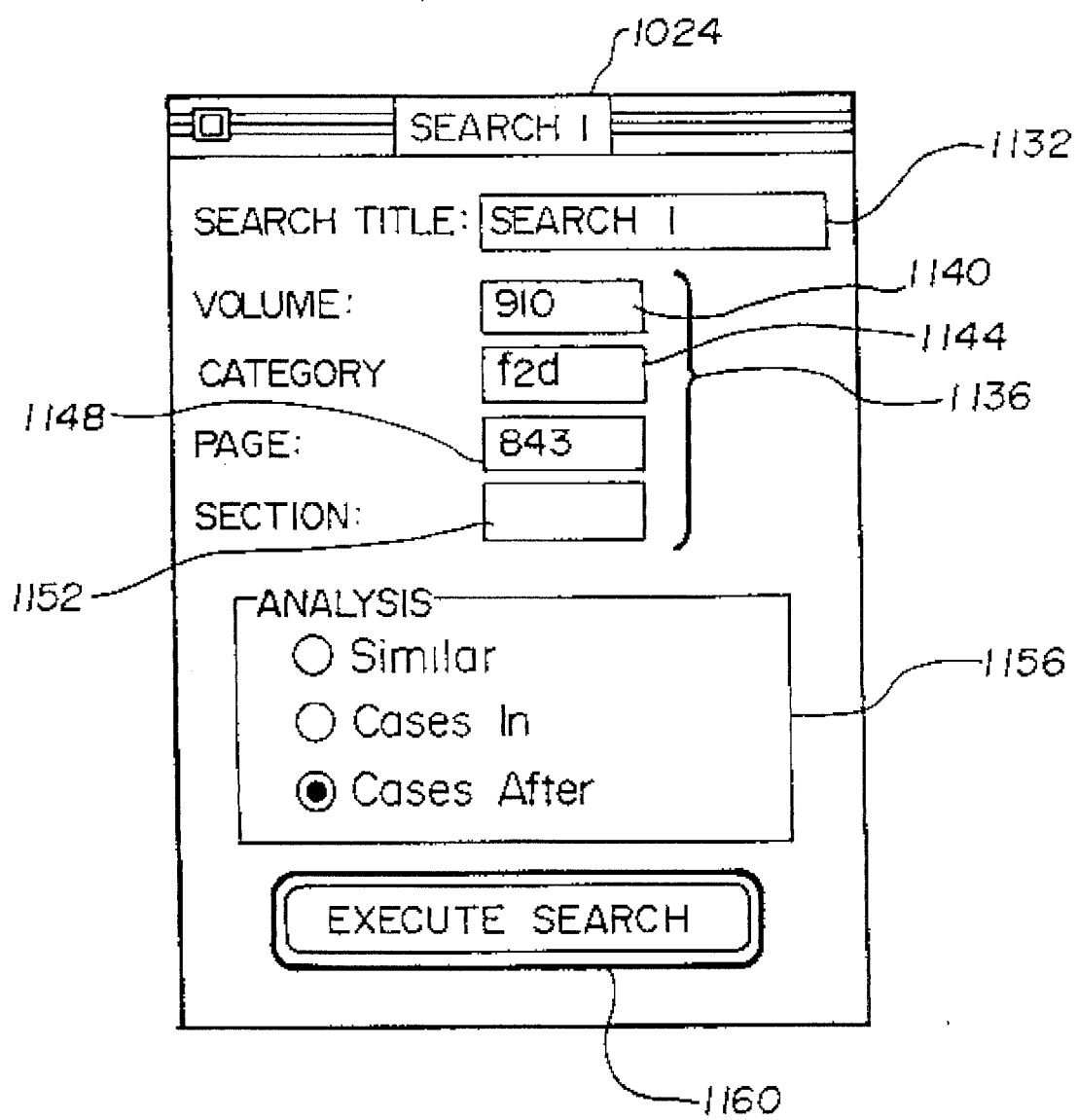
FIG. 5H depicts an Execute Search Window.
Figure 6:
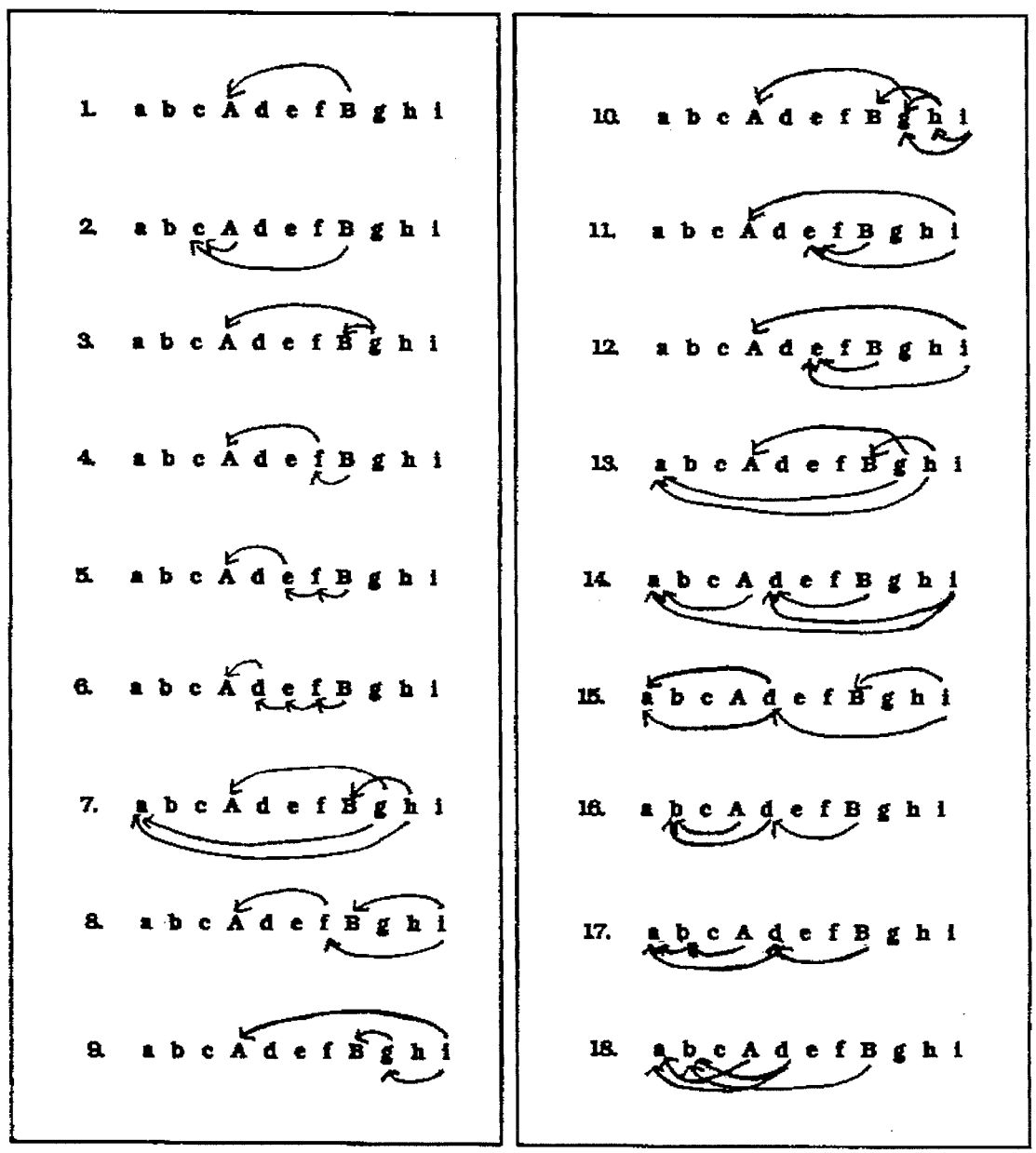
FIG. 6 Schematic Representations of the Eighteen Primary Patterns.

FIG. 5H:

FIG. 5H depicts a close-up view of an Execute Search Window. The researcher can input a selected textual object that is either represented or not represented on a display 38 screen as a Textual Object Active Box 1032. The researcher can title his search by inputing the title in the Search Title box. The researcher can then input the reference to the selected textual object in the reference input boxes. The reference input boxes of the preferred embodiment allow the researcher to refer to the selected textual object by Volume, Category, Page and/or Section by inputing the appropriate values in the volume reference box, category reference box, page reference box, and/or section reference box, respectively.

The researcher can also identify the type of search to be performed on the selected textual object by selecting the appropriate search in the Analysis box.

Once the researcher has inputed all the appropriate values, the researcher executes the search by activating the execute search button.

The PSDS 524, PPDS 528, PIDS 532 and PPSDS 536 of the GUI Program 70, also create similar displays to the CIDS 512, CADS 516, and SCDS 520 subroutines. The only major difference between the screens created by the three textual object display subroutines and the four pool display subroutines is the information contained in the Execute Search window and the options available in the analysis box.

The options in the analysis box enable a researcher to select a textual object outside the pool of textual objects and compare how the selected textual object relates to the pool of textual objects by selecting to the Pool-Similarity Subroutine 44, the Pool-Paradigm Subroutine 248 or Pool-Importance Subroutine 252 of the CSPDM 66.

The PSDS 524 creates a Pool-Similarity Screen 1008. The vertical axis 1012 ranks the similarity of the objects in a pool of textual objects with respect to a selected textual object. All of the other aspects of this display 38 are similar to the Similar Cases Screen.

PPDS 528 creates a Pool-Paradigm Screen. The vertical axis 1012 ranks the similarity of the pool of textual objects on the screen with respect to the paradigm textual object. The paradigm textual object is calculated by averaging the mean of all the Euclidean distances of the pool of textual objects on the screen. All of the other aspects of this display 38 are similar to the Similar-Cases Screen.

The PIDS 532 creates a Pool-Importance Screen. The vertical axis 1012 ranks the importance of the pool of textual objects on the screen. All other aspects of the PIDS 532 display 38 are similar to the Cases-In Screen 1000 and Cases-After Screen 1004.

The PPSDS 536 creates a Pool-Paradigm Similarity Screen 1008. The vertical axis 1012 represents the similarity of all textual objects in the database 54 to the paradigm textual object created by a selected pool of textual objects.

All other aspects of the PPSDS 536 display 38 are similar to Similar-Cases Screen.

What is claimed is:

1. A research system for computerized searching of textual objects, wherein the textual objects are stored in a database, comprising:
   a computer processor for processing commands and manipulating the textual objects stored in the database;
   a means, coupled to the computer processor, for entering the commands to be processed by the computer processor;
   a means for indexing the textual objects using the computer processor and the entered commands comprising:
      a means for creating vectors representing the textual objects wherein the vectors are created using non-semantical relationships that exist among or between the textual objects;
   a means for searching the indexed textual objects using the vectors to obtain a pool of textual objects comprising a means for vector searching of the indexed textual objects using the vectors;
   a graphical user interface means for converting the pool of textual objects into a graphical view comprising:
      a means for forming a box to graphically represent one or more of the textual objects in the pool; and
   a display, operably coupled to the graphical user interface means, for showing the graphical view including any of the boxes formed.

2. The research system of claim 1 wherein the means for searching the indexed textual objects further comprises:
   means for receiving processed commands from the computer processor which identify a pool of textual objects;
   means for locating textual objects similar to those textual objects in the pool; and
   means for ranking the importance of the textual objects in the pool.

3. The research system of claim 1 wherein the means for searching the indexed textual objects further comprises:
   means for creating a vector representing a paradigm textual object.

4. The research system of claim 1 wherein the graphical user interface means further comprises:
   means for selecting one of the boxes;
   means for displaying further information on the selected box;
   zoom-in means for enlarging the size of a portion of the graphical view; and
   zoom-out means for decreasing the size of a portion of the graphical view.

5. The research system of claim 1 wherein the textual objects contain core words, the means for entering commands comprises a keyboard, and wherein the means for indexing further comprises:
   a means for generating a boolean word index of the core words found in the textual objects; and
   wherein the means for searching uses both pattern vectors and the boolean word index and further comprises:
      a means for performing boolean word searches of the textual objects using the boolean word index.

6. The research system of claim 1 wherein a textual object may be selected using the means for entering the commands and wherein the means for searching the indexed textual objects further comprises:
   means for receiving the identity of a selected textual object;
   cases-after means for identifying textual objects that refer to the selected textual object; and
   cases-in means for identifying textual objects to which the selected textual object refers.

7. The research system of claim 1 wherein a pool of textual objects may be selected using the means for entering the commands and wherein the means for searching the indexed textual objects further comprises:
   means for receiving the identity of the selected pool of textual objects;
   pool-similarity means for identifying a similar pool of textual objects wherein the objects in the similar pool are similar to the objects in the selected pool; and
   pool-importance means to identify an important pool of textual objects wherein the objects in the important pool are important in relation to the objects in the selected pool.

8. The research system of claim 1 wherein the means for creating vectors representing the textual objects further comprises:
   extractor means for creating an initial numerical representation of each textual object wherein the initial numerical representations are based on direct non-semantical relationships between the textual objects;
   patterner means for analyzing the initial numerical representations of each textual object to find relationships that exist between or among the textual objects comprising:
      means for calculating a pattern vector representation for each textual object.

9. The research system of claim 8 wherein the means for creating vectors representing the textual objects further comprises:
   weaver means for generating proximity vectors based upon the pattern vector representations for each object.

10. The research system of claim 9 wherein the weaver means for generating proximity vectors comprises:
    a means for calculating euclidean distances between pattern vectors.

11. The research system of claim 9 wherein the means for creating vectors further comprises:
    means for calculating similarity vectors representing the similarity between textual objects using the proximity vectors.

12. A legal research system for computerized searching of textual objects containing core words, wherein the textual objects are stored in a database, comprising:
    a computer processor for processing commands and manipulating the textual objects stored in the database;
    a keyboard means, coupled to the computer processor, for entering the commands to be processed by the computer processor;
    a means for indexing the textual objects using the computer processor and the entered commands comprising;
       a means for creating vectors representing the textual objects; and
       a means for generating a boolean word index of the core words found in the textual objects;
    a means for searching the indexed textual objects using the vectors and the boolean word index to obtain a pool of textual objects comprising;
       a means for performing boolean word searches using the boolean word index: and
       a means for vector searching of the indexed textual objects using the vectors, comprising:
  means for receiving processed commands from the computer processor which identify a selected textual object;
  cases-after means for identifying textual objects that refer to the selected textual object;
  cases-in means for identifying textual object to which the selected textual object refers; and
  similarity means for identifying textual objects which have similar characteristics to the selected textual object;
  a graphical user interface means for converting the pool of textual objects into a graphical view comprising:
  a means for forming a box to graphically represent one or more of the textual objects in the pool; and
  a display, operably coupled to the graphical user interface means, for showing the graphical view including any of the boxes formed.

13. A system for proximity indexing a plurality of data comprising:
  storage means, connected to the grouping means, for storing a plurality of data in a database;
  a computer processor for manipulating the plurality of data;
  means for enabling the computer processor to access the plurality of data stored in the database;
  extractor means for creating a numerical representation of each accessed datum;
  patterner means for analyzing the numerical representation of the plurality of data for patterns comprising:
    means for a calculating a pattern representation for each datum based upon that datums relationship to every other datum; and
    means for weighing the significance of the pattern representation;
  weaver means for generating an index on the proximity of each datum to every other datum comprising:
    a means for determining the Euclidian distance between two pattern representations; and
  memory for storing the index on the proximity of each datum to every other datum.

14. The system of claim 13 wherein each of the purality of data is a non-textual object and wherein the extractor means further comprises:
  means for numerically representing with a vector the non-textual objects; and
  means for clustering non-textual objects having similar characteristics.

15. The system of claim 13 wherein the extractor means further comprises:
  means for generating a reference number for each of the plurality of data;
  means for determining which of the plurality of data refer to any other of the plurality of data; and
  means for creating a core word index.

16. The system of claim 13 wherein the patterner means further comprises:
  means for analyzing the numerical representation against a plurality of empirically defined patterns, wherein certain of the patterns are more important than others; and
  wherein the means for weighing further comprises means for heavily weighing certain patterns.

17. The system of claim 13 wherein the weaver means further comprises:
  means for making a similarity determination based upon the Euclidian distances calculated.

18. The system of claim 13 wherein the plurality of data are received in a digital signal, the system further comprising:
  means for receiving the digital signals;
  means, connected to the receiving means, for interpreting the digital signals into data;
  means, connected to the interpreting means and storage means, for grouping the plurality of data into a database format;
  means, connected to the memory, for converting the index into a transmission signal; and
  means, connected to the converting means, for transmitting the transmission signal representing the index.

19. A system for computerized searching of an index which catalogs a database of objects comprising:
  key means for entering search commands;
  a processor, connected to the key means, for processing the search commands;
  means to retrieve the index utilizing the processor;
  multiple search means to analyze the index and identify a pool of one or more of the objects based upon a processed search command comprising:
    means for interpreting a processed search command as a selection of an object;
    means for identifying a pool of objects that have a relation to the selected object;
    means for generating a paradigm object; and
    means for defining a pool of objects that have non-semantical characteristics similar to the paradigm object; and
  a display for viewing the objects in a pool.

20. The system of claim 19 further comprising:
  means for creating an alphanumeric list of names of the objects in a pool for display.

21. A graphical user interface to display a pool of identified objects stored in a database comprising:
  means for receiving the identity of objects to be displayed;
  means for collecting data indicating a first relationship between objects in the pool and data indicating a second relationship between objects in the pool;
  means for determining a coordinate X/Y location for each identified object in the pool based upon the data indicating a first and second relationship comprising:
    means for comparing the data indicating the first relationship for determining an X coordinate for each object; and
    means for comparing the data indicating the second relationship for determining a Y coordinate for each object;
  means for generating a first window with an X axis and Y axis;
  means for creating a box for each identified object;
  means for placing the box for each identified object in the correct X/Y position in the first window;
  means for displaying the first window with one or more boxes; and
  means to select a displayed box and obtain further information about the object represented by the displayed box.

22. The graphical user interface of claim 21 further comprising:

means for displaying a second window stacked on top of the first window; and means for moving the second window on the display.

23. The graphical user interface of claim 21, wherein the first relationship is importance and the second relationship is similarity, further comprising:

means to zoom in on a particular portion of the first window; and means to zoom out to view a greater proportion of the first window.

24. The graphical user interface of claim 21 further comprising:

means for requesting a database search comprising:
an active display box;
a mouse for entry of commands by a user based on the display; and
means for converting the mouse entered commands into a database search request.

25. The graphical user interface of claim 21, wherein the means for displaying further comprises a color monitor;

wherein the means for creating a box further comprises means to color the box;

wherein the means for generating a first window further comprises a means to generate a light colored background and dark lines representing a coordinate grid.

26. A non-semantical method for numerically representing objects in a computer database and for computerized searching of the numerically represented objects in the database, wherein direct and indirect relationships exist between objects in the database, comprising:

marking objects in the database so that each marked object may be individually identified by a computerized search;

creating a first numerical representation for each identified object in the database based upon the object's direct relationship with other objects in the database;

storing the first numerical representations for use in computerized searching;

analyzing the first numerical representations for indirect relationships existing between or among objects in the database;

generating a second numerical representation of each object based on the analysis of the first numerical representation;

storing the second numerical representation for use in computerized searching; and searching the objects in the database using a computer and the stored second numerical representations, wherein the search identifies one or more of the objects in the database.

27. The non-semantical method of claim 26, wherein the objects in the database include words, and semantic indexing techniques are used in combination with the non-semantical method, the method further comprising the step of creating and storing a boolean word index for the words of the objects in the database.

28. The non-semantical method of claim 26, wherein the first and second numerical representations are vectors that are arranged in first and second matrices;

the direct relationships are express references from a one object to another object in the database;

the objects in the database are assigned chronological data; and wherein the step of searching comprises the steps of
matrix searching of the second matrices; and
examining the chronological data.

29. The non-semantical method of claim 26 wherein the step of analyzing the first numerical representation further comprises:

examining the first numerical representation for patterns which indicate the indirect relationships.

30. The non-semantical method of claim 29, given that object A occurs before object B and object c occurs before object A, and wherein the step of creating a first numerical representation comprises examining for the direct relationship B cites A and wherein the step of examining for patterns further comprises the step of examining for the following pattern:

A cites c, and B cites c.

31. The non-semantical method of claim 29, wherein a, b, c, A, d, e, f, B, g, h, and i are objects in the database and given that;

a, b, and c occur before A;

A occurs before d, e, and f, which occur before B; and

B occurs before g, h, and i;

and wherein the step of examining for patterns further comprises the step of examining for one or more of the following patterns:

(i) g cites A, and g cites B;
(ii) B cites f, and f cites A;
(iii) B cites f, f cites e, and e cites A;
(iv) B cites f, f cites e, e cites d, and d cites A;
(v) g cites A, h cites B, g cites a, and h cites a;
(vi) i cites B, i cites f (or g), and f (or g) cites A;
(vii) i cites g, i cites A, and g cites B;
(viii) i cites g (or d), i cites h, g (or d) cites A, and h cites B;
(ix) i cites a, i cites B, and A cites a;
(x) i cites A, i cites e, B cites e;
(xi) g cites A, g cites a, A cites a, h cites B, and h cites a;
(xii) A cites a, B cites d, i cites a, and i cites d;
(xiii) i cites B, i cites d, A cites a, and d cites a;
(xiv) A cites b, B cites d (or c), and d (or c) cites b;
(xv) A cites b, B cites d, b cites a, and d cites a;
(xvi) A cites a, B cites b, d (or c) cites a, and d (or c) cites b.

32. The non-semantical method of claim 26, wherein the step of analyzing further comprises the step of weighing, wherein some indirect relationships are weighed more heavily than other indirect relationships.

33. The non-semantical method of claim 26, wherein the step of analyzing the first numerical representations for indirect relationships further comprises:

creating an interim vector representing each object; and wherein the step of generating a second numerical representation uses coefficients of similarity and further comprises:

calculating euclidean distances between interim vector representations of each object;

creating proximity vectors representing the objects using the calculated euclidean distances; and using the proximity vectors and using coefficients of similarity to calculate the second numerical representations.

34. The non-semantical method of claim 26, wherein objects in the database may be divided into subsets and wherein the marking step includes the step of marking subsets of objects in the database and wherein relationships exist between or among subsets of objects in the database.

35. The non-semantical method of claim 34 wherein the objects are textual objects with paragraphs and the subsets are the paragraphs of the textual objects, the method further comprising the steps of:

creating a subset numerical representation for each subset based upon the relationships between or among subsets;

analyzing the subset numerical representations;

clustering the subsets into sections based upon the subset analysis; and generating a section numerical representation for each section, wherein the section numerical representations are available for searching.

36. The non-semantical method of claim 26, wherein the step of searching the objects comprises the steps of:

selecting an object;

using the second numerical representation to search for objects similar to the selected object.

37. The non-semantical method of claim 26, wherein the step of searching includes the step of graphically displaying one or more of the identified objects.

38. The non-semantical method of claim 26, wherein the step of searching comprises the step of identifying a paradigm object.

39. The non-semantical method of claim 26, wherein the step of searching the objects comprises the steps of:

selecting a pool of objects;

pool-similarity searching to identify a similar pool of textual objects, similar in relation to the objects in marked pool; and pool-importance searching to identify an important pool of textual objects, important in relation to the objects in the selected pool.

40. The non-semantical method of claim 26, the step of searching comprising the steps of:

identifying a paradigm pool of objects; and searching for relationships between the objects and the paradigm pool of objects;

wherein the searched for relationship is pool importance or pool similarity.

41. A method for the non-semantical indexing of objects stored in a computer database, the method for use in searching the database for the objects, comprising the steps of:

extracting, comprising the steps of:

labeling objects with a first numerical representation; and generating a second numerical representation for each object based on each object's references to other objects;

patterning, comprising the step of creating a third numerical representation for each object using the second numerical representations, wherein the third numerical representation for each object is determined from an examination of the second numerical representations for occurrences of patterns that define indirect relations between or among objects;

weaving, comprising the steps of:

calculating a fourth numerical representation for each object based on the euclidean distances between the third numerical representations; and determining a fifth numerical representation for each object by processing the fourth numerical representations through similarity processing; and storing the fifth numerical representations in the computer database as the index for use in searching for objects in the database.

42. The method of claim 41 wherein the first through fifth numerical representations are vector representations and further comprises the step of clustering objects having similar characteristics.

43. The method of claim 42, wherein the objects are paragraphs and the step of clustering objects comprises the step of clustering adjacent paragraphs that have similar characteristics.

44. The method of claim 41 wherein the step of creating the third numerical representations further comprises the steps of:

analyzing the second numerical representation against a plurality of empirically defined patterns, wherein certain patterns are more important than others; and weighing the analyzed second numerical representations according to the importance of the patterns.

45. A method for searching indexed objects, wherein the index is stored, comprising the steps of:

entering search commands;

processing the search commands with a processor;

retrieving the stored index using the processor;

analyzing the index to identify a pool of objects, comprising the steps of:

interpreting the processed searched commands as a selection of an object;

identifying a group of objects that have a relationship to the selected object, wherein the step of identifying comprises the steps of:

identifying objects that are referred to by the selected object; and identifying objects that refer to the selected object quantifying the relationship of the selected object to each object in the group of objects; and ranking the objects in the group of objects in accordance to the quantified relationship to the selected object; and presenting one or more objects from the group of objects in ranked order.

46. A method for searching indexed objects, wherein the index is stored, chronological information is associated with each object in the group, and a paradigm object may be identified, comprising the steps of:

entering search commands;

processing the search commands with a processor;

retrieving the stored index using the processor;

analyzing the index to identify a pool of objects, comprising the steps of:

interpreting the processed searched commands as a selection of an object;

identifying a group of objects that have a relationship to the selected object;

quantifying the relationship of the selected object to each object in the group of objects;

ranking the objects in the group of objects in accordance to the quantified relationship to the selected object;

chronologically ordering the objects in the group to form a pool of objects;

ordering the objects in the pool by rank based upon their relationship to a paradigm object; and presenting one or more objects from the pool of objects in ranked order.

47. A method for graphically displaying and interfacing with a pool of identified objects stored in a database using information indicating relationships, comprising the steps of:

receiving the identity of objects in the pool;

collecting information indicating a first relationship among objects in the pool;

gathering information indicating a second relationship among objects in the pool;

determining a coordinate X/Y position for each identified object in the pool based upon the information indicating a first and second relationship comprising the steps of:

comparing the information indicating the first relationship for determining an X coordinate for each identified object; and comparing the information indicating the second relationship for determining a Y coordinate for each identified object;

generating a first window with an X axis and Y axis, wherein the X and Y axis are able to accommodate the X and Y coordinate for each object;

creating a graphical box for each identified object, the box having sides and a bottom;

placing a side and the bottom of the graphical box for each identified object in the correct X/Y axis position in the first window;

labeling the placed box;

displaying the first window with one or more labeled boxes; and selecting a displayed box to obtain further information about the identified object represented by the displayed box.

48. The method of claim 47 further comprising further comprising the steps of:

generating a second window stacked on top of the first window; and moving the second window on the display.

49. The method of claim 47, wherein the first relationship is importance and the second relationship is similarity, and wherein the step of displaying comprises the steps of:

zooming in on a particular portion of the displayed first window; and zooming out to view a different proportion of the displayed first window.

50. The method of claim 47 wherein an active display box is used, further comprising the steps of:

requesting a database search, comprising the steps of:
displaying the active display box;

entering commands from a user by operation of a mouse on the active display box; and converting the entered commands into a database search request.

51. A system for computerized searching of an index which catalogs a database of objects comprising:

key means for entering search commands;

a processor, connected to the key means, for processing the search commands;

means to retrieve the index utilizing the processor;

multiple search means to analyze the index and identify a pool of one or more of the objects based upon a processed search command comprising:

means for interpreting a processed search command as a selection of an object;

means for identifying a pool of objects that have a relation to the selected object, wherein the means for identifying a pool of objects further comprises:

means for identifying objects that are referred to by the selected object;

means for identifying objects that refer to the selected object; and means for identifying objects that have a similar characteristic to the selected object;

means for generating a paradigm object; and means for defining a pool of objects that have characteristics similar to the paradigm object; and a display for viewing the objects in a pool.

52. A system for computerized searching of an index which catalogs a database of objects comprising:

key means for entering search commands;

a processor, connected to the key means, for processing the search commands;

means to retrieve the index utilizing the processor;

multiple search means to analyze the index and identify a pool of one or more of the objects based upon a processed search command comprising:

means for interpreting a processed search command as a selection of an object;

means for identifying a pool of objects that have a relation to the selected object;

means for generating a paradigm object; and means for defining a pool of objects that have characteristics similar to the paradigm object;

means for chronologically ordering the objects in a pool;

means for rank ordering the objects in a pool based upon their relationship to the selected object;

means for rank ordering the objects in a pool based upon their relationship to the paradigm object; and a display for viewing the objects in a pool.

\* \* \* \* \*

(12) EX PARTE REEXAMINATION CERTIFICATE (8549th)
United States Patent
Egger

(10) Number: US 5,544,352 C1
(45) Certificate Issued: Sep. 20, 2011

(54) METHOD AND APPARATUS FOR INDEXING, SEARCHING AND DISPLAYING DATA

(75) Inventor: Daniel Egger, Washington, DC (US)

(73) Assignee: Software Rights Archive, LLC, Durham, NC (US)

Reexamination Request:
No. 90/011,010, May 24, 2010

Reexamination Certificate for:
Patent No.: 5,544,352
Issued: Aug. 6, 1996
Appl. No.: 08/076,658
Filed: Jun. 14, 1993

(51) Int. Cl.
*G06F 17/30* (2006.01)

(52) U.S. Cl. .................................. 707/715; 707/999.005
(58) Field of Classification Search .................... 395/600
See application file for complete search history.

(56) References Cited

PUBLICATIONS

Brin, et al., "The Anatomy of a Large–Scale Hypertextual Web Search Engine", Computer Networks and ISDN Systems, vol. 30 (1–7), 1998, pp. 107–117.
Bruandet, "Outline of a Knowledge Base Model for an Intelligent Information Retrieval System", Information Processing & Management, vol. 25, Issue 1, 1989, pp. 89–115.
Garfield, "Citation Indexes for Science", vol. 123, No. 3159, Jul. 1955, pp. 108–111.
Garfield, "The Role of the Medical Librarian in SDI Systems", Bulletin of the Medical Library Association, vol. 57, No. 4, Oct. 1969, pp. 348–351.
Giles, et al., "CiteSeer: An Automatic Citation Indexing System", Third ACM Conference on Digital Libraries, ACM Press, 1998, pp. 89–98.
Matula, "k–Components, Clusters, and Slicings in Graphs", SIAM Journal on Applied Mathematics, vol. 22, No. 3, May 1972, pp. 459–480.

Salton, et al., "Automatic Structuring and Retrieval of Large Text Files", Communications of the ACM, vol. 37, No. 2, Feb. 1994, pp. 97–108.
Salton, et al., "Enhancement of Text Representations Using Related Document Titles", Information Processing & Management vol. 22, No. 5, 1986, pp. 385–394.
Carpenter et al., "Culstering of Scientific Journals" ASIS 24(6):425–436, 1973 (Exhibit B to Defendants' Identification of Prior Art).
Aalbersberg, A Document Retrieval Model Based on Term Frequency Ranks, Springer–Vertag New York, Inc. New York, NY, pp. 164–171, 1994; 11 pgs.
Aho et al., Data Structures and Algorithms, Addison–Wesley Publishing Company, pp. 199–229, pp. 171–223, 1983, 19 pgs.

(Continued)

*Primary Examiner* — Joshua Campbell

(57) ABSTRACT

A computer research tool for indexing, searching and displaying data is disclosed. Specifically, a computer research tool for performing computerized research of data including textual objects in a database and for providing a user interface that significantly enhances data presentation is described. Textual objects and other data in a database are indexed by creating a numerical representation of the data. The indexing technique called proximity indexing generates a quick-reference of the relations, patterns and similarity found among the data in the database. Proximity indexing indexes the data by using statistical techniques and empirically developed algorithms. Using this proximity index, an efficient search for pools of data having a particular relation, pattern or characteristic can be effectuated. The Computer Search program, called the Computer Search Program for Data represented in Matrices (CSPDM), provides efficient computer search methods. The CSPDM rank orders data in accordance with the data's relationship to time, a paradigm datum, or any similar reference. The user interface program, called the Graphical User Interface (GUI), provides a user friendly method of interacting with the CSPDM program and prepares and presents a visual graphical display. The graphical display provides the user with a two dimensional spatial orientation of the data.

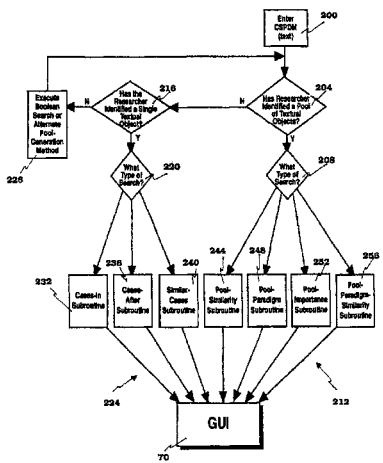

PUBLICATIONS

Aho, et al., The Design and Analysis of Computer Algorithms; Addison–Wesley Publishing Company, 1976, 30 pgs.

Baase, Computer Algorithms: Introduction to Design and Analysis, Chapter 3: Graphs & Digraphs, pp. 114–169, Addison–Wesley Publishing Company, 1978, 28 pgs.

Bichteler et al., Comparing Two Algorithms for Document Retrieval Using Citation Links, Journal of the American Society of Information Science, vol. 28, No. 4, pp. 192–195, Jul. 1977, 4 pgs.

Caplinger, Graphical Database Browsing, Bell Communications Research, Room 2A–261, 435 South Street, Morristown, NJ 07960, 1986; pp. 113–118, 6 pgs.

Cowart; Master Windows 3.1, Apr. 2, 1992, pp. 64–76, 867.

Crouch et al., The Automatic Generation of Extended Queries, Department of Computer Science, Duluth, Minnesota, pp. 369–383, 1990, 15 pgs.

Crouch, et al., The Use of Cluster Hierarchies in Hypertext Information Retrieval, Department of Computer Science, Duluth, Minnesota, Hypertext '89 Proceedings, pp. 225–237, Nov. 1989, 14 pgs.

Fritsche, Commission of the European Communities: Automatic Clustering Techniques in Information Retrieval, Joint Nuclear Research Center, Ispra Establishment, Italy 1974, 142 pgs.

Furner et al., Information Retrieval and Hypertext: The Representation and Comparison of Hypertext Structures Using Graphs, Kluwer Academic Publishers, Norwell, Massachusetts, pp. 75–96, 1996, 14 pgs.

Golub et al., Matix Computations, The Johns Hopkins University Press, pp. 1–476, 492 pgs.

Hearst et al., Subtopic Structuring for Full–Length Document Access, Computer Science Division, Berkeley, CA, Proc. 16$^{th}$ SIGIR, pp. 59–68, 1993, 10 pgs.

Horowitz et al., Fundamentals of Data Structures, Chapter 6, Graphs, Computer Science Press, Inc., pp. 282–335, 1976 and 1982, 28 pgs.

Invalidity Claim Chart for U.S. Patent. No. 5,544,362 of Certain Exemplary Combinations, p. 1–17, 17 pgs.

Kommers, Designing Hypermedia for Learning: Chapter 7, Graph Computation as an Orientation Device in Extended and Cyclic Hypertext Networks, pp. 117–134, Springer–Verlag, Berlin, 1990, 20 pgs.

Kungl, Statskontoret, Citation Index and Measures of Association in Mechanized Document Retrieval Swedish Rationalization Agency, Stockholm, Jan. 1, 1967, 14 pgs.

Libertach, Inc. V–Search™ Integration Toolkit for Folio VIEWS, Beta Release 2.0, User's Manual, Preliminary Draft, Draft 1.0, pp. 1–36, Dec. 6, 1995, 43 pgs.

Libertech, Inc., V–Search™ Publisher's Toolkit, Beta Release 1.0, User's Manual, Draft 2.0, pp. 1–160, Dec. 8, 1995, 171 pgs.

Products in the News: Document Relationships at a Glance, Electronic–Documents, vol. 3, No. 12, 1994, 1 pg.

Salton et al., A Citation Study of the Computer Science Literature, Department of Computer Science, Ithaca, NY, 46 pgs.

Salton et al., Automatic Text Structuring and Retrieval—Experiments in Automatic Encyclopedia Searching, Department of Computer Science, Cornell University, pp. 21–30, 1991, 10 pgs.

Edward Fox,"Extending the Boolean and Vector Space Models of Information Retrieval with P–Norm Queries and Multiple Concept Types." Cornell University, 1983 ("Fox").

Ralph Garner, et al., "A Computer–Oriented Graph Theoretic Analysis Of Citation Index Structures," Three Drexel Information Science Research Studies, Ed. Flood, B., Drexel Press, 1967 ("Garner").

Gerard Salton, "Associative Document Retrieval Techniques Using Bibliographic Information," pp. 440–457, 1963 ("Salton 1963").

Donald B. Cleveland, "An n–Dimensional Retrieval Model," Journal Of The American Society For Information Science, Oct. 1976, vol. 27, No. 6, pp. 342–347 ("Cleveland").

Colin Tapper, "The Use Of Citation Version For Legal Information Retrieval," Journal of Law and Information Science, vol. 1, No. 2, pp. 131–161 (1992) ("Tapper").

Gerard Salton and Chris Buckley, "Approaches To Text Retrieval For Structural Documents," Dept. of Computer Science, Cornell University, Jan. 1990 ("Salton 1990").

Fazli Can and Esen A. Ozkarahan, "A Dynamic Cluster Maintenance System for Information Retrieval," ACM, vol. 6, p. 123, 1987 ("Can").

Elizabeth Aversa, "Research on Research: Customized Citation Analysis for Governmental, Industrial, and Academic Clients," Current Comments, p. 77, Jun. 8, 1992 ("Aversa").

EX PARTE
REEXAMINATION CERTIFICATE
ISSUED UNDER 35 U.S.C. 307

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 26-42 and 44 is confirmed.

Claim 45 is cancelled.

New claims 53-61 are added and determined to be patentable.

Claims 1-25, 43 and 46-52 were not reexamined.

*53. A method for analyzing non-semantical relationships existing among a set of objects in a database, comprising:*

*labeling, with a computer processor, objects in a first set of objects using a computer-readable identifier;*

*generating, using a computer processor, a numerical representation for individual objects in said first set of objects based upon said individual object's direct relationships, if any, with other of said individual objects in said first set of objects,*

*generating, using a computer processor and said numerical representations, a value for said individual objects in said first set of objects, wherein said value accounts for direct and indirect relationships that exist with other objects in said first set of objects, wherein said generating includes quantifying, for a plurality of said objects in said first set of objects, one or more indirect relationships, wherein quantifying indirect relationships for said plurality of objects includes scoring the following three indirect relationships:*
*i) B cites f and f cites A,*
*ii) B cites f, f cites e, and e cites A, and*
*iii) B cites f, f cites e, e cites d, and d cites A,*
*wherein at least one of B, d, e, f, and A are objects in the set of objects and said scoring of indirect relationships uses weights that are calculated using one or more of said objects' quantity of outbound direct relationships;*

*storing the generated values in one or more computer memories in an index;*

*receiving search commands wherein the search commands are received from an input device, wherein the received search commands include one or more search terms;*

*identifying a resultant second set of said objects that are associated with one or more search terms using at least a word index and the received search commands;*

*determining a rank for objects in said resultant second set of objects using said values as a factor in determining the rank; and*

*sending, for use by a display device, information for displaying identities of two or more objects in said resultant second set of objects using the rank as a factor in determining an order of display.*

*54. The method of claim 53 wherein generating a value further comprises accounting for shape characteristics of an image.*

*55. The method of claim 53, further comprising:*
*computerized extraction of information from said objects and using said information to create said numerical representation.*

*56. The method of claim 53 wherein storing the generated values is performed prior to receiving the search commands and wherein the values are stored in a database.*

*57. The method of claim 53 wherein values are generated independent from the search commands.*

*58. The method of claim 53 wherein quantifying said object's indirect relationships further includes weighing, wherein some types of indirect relationships are weighed more heavily than others.*

*59. The method of claim 53 wherein said rank is an importance rank.*

*60. The method of claim 53 wherein said use of objects' quantity of outbound direct relationships is as a divisor in a ratio.*

*61. A data processing system for use in analyzing non-semantic relationships existing among a set of objects, including indirect relationships between objects in the set, comprising:*

*one or more computer processors for producing results and sending results for display configured to execute instructions to:*

*label objects among the set of objects using a computer-readable identifier;*

*generate, using a computer processor, a plurality of numerical representations of individual objects among the set of objects based upon direct relationships for said individual objects with other objects in the set of objects,*

*calculate a value for the individual objects among the set of objects, the value accounting for direct and indirect relationships existing among objects, wherein the calculation considers at least the following indirect relationships for a given object A or B:*
*i) B cites f and f cites A,*
*ii) B cites f, f cites e, and e cites A, and*
*iii) B cites f, f cites e, e cites d, and d cites A, wherein at least one of B, d, e, f, and A are objects in the first set of objects and certain indirect relationships contribute greater value to the value than other indirect relationships;*

*receive search input including one or more search terms emanating from an input device; identify, using the one or more search terms, a word index and the assigned identifiers, a second set of objects, wherein the second set of objects is a subset of the first set of objects having fewer objects;*

*rank a plurality of the objects in the second set of objects, wherein the value is used as a factor in performing the ranking; and*

*send search results about the ranked objects for display, wherein identifying information for two or more of the ranked objects is sent to be displayed in a ranked order display;*

*one or more computer memory devices that store data including:*
*the identification for each object in the first set of objects,*

*the values, and*
*the word index,*
*wherein the values are stored in the one or more computer memory devices before the one or more computer processors process the received search input; and*
*a network for use by the one or more computer processors.*

\* \* \* \* \*